United States Patent
Lal et al.

(10) Patent No.: US 12,395,369 B2
(45) Date of Patent: Aug. 19, 2025

(54) SYSTEMS AND METHODS FOR DECENTRALIZED GENERATION OF A SUMMARY OF A VIRTUAL MEETING

(71) Applicant: Adeia Guides Inc., San Jose, CA (US)

(72) Inventors: Dhananjay Lal, Englewood, CO (US); Mustafa Coskun, Kayseri (TR); Vehbi Cagri Gungor, Kayseri (TR)

(73) Assignee: ADEIA GUIDES INC., San Jose, CA (US)

( * ) Notice: Subject to any disclaimer, the term of this patent is extended or adjusted under 35 U.S.C. 154(b) by 0 days.

(21) Appl. No.: 18/735,359

(22) Filed: Jun. 6, 2024

(65) Prior Publication Data

US 2024/0406020 A1 Dec. 5, 2024

Related U.S. Application Data

(63) Continuation of application No. 18/093,575, filed on Jan. 5, 2023, now Pat. No. 12,057,956.

(51) Int. Cl.
*H04L 12/18* (2006.01)

(52) U.S. Cl.
CPC .............................. *H04L 12/1831* (2013.01)

(58) Field of Classification Search
CPC ................................................. H04L 12/1831
See application file for complete search history.

(56) References Cited

U.S. PATENT DOCUMENTS

| | | | |
|---|---|---|---|
| 9,672,829 B2 | 6/2017 | Chen et al. | |
| 11,082,661 B1 * | 8/2021 | Pollefeys | H04N 7/15 |
| 11,133,005 B2 | 9/2021 | Aher et al. | |
| 12,057,956 B2 | 8/2024 | Lal et al. | |
| 2004/0008249 A1 * | 1/2004 | Nelson | H04N 7/152 348/14.09 |
| 2007/0162569 A1 * | 7/2007 | Robinson | H04L 63/0421 709/219 |
| 2017/0295213 A1 | 10/2017 | Aaron et al. | |

(Continued)

OTHER PUBLICATIONS

Anonymous, "The Amount of Data and Bandwidth Required for Streaming Video," (no date) ( https://gobrolly.com/amount-data-bandwidth-required-streaming-video/) (Nov. 2022).

(Continued)

*Primary Examiner* — Raqiul A Choudhury
(74) *Attorney, Agent, or Firm* — HALEY GUILIANO LLP

(57) ABSTRACT

Systems, methods and apparatuses are described for providing a summary associated with a virtual meeting. In response to detecting a break in presence (BIP) at a first computing device for a first user in the virtual meeting, each of one or more second computing devices participating in the virtual meeting and corresponding to at least one second user may be caused to locally monitor reactions of the corresponding at least one second user to the virtual meeting during the BIP. The server may receive one or more parameters associated with the locally monitored reactions and corresponding to a portion of the virtual meeting during the BIP. In response to determining to generate a summary associated with a corresponding portion of the virtual meeting during the BIP, based on the received one or more parameters, the summary may be generated and provided to the first computing device.

20 Claims, 11 Drawing Sheets

(56) References Cited

U.S. PATENT DOCUMENTS

| | | | |
|---|---|---|---|
| 2018/0077099 A1* | 3/2018 | Silva | H04L 51/04 |
| 2018/0331842 A1* | 11/2018 | Faulkner | H04N 7/15 |
| 2021/0014676 A1 | 1/2021 | Silverstein et al. | |
| 2021/0021439 A1* | 1/2021 | Gorny | H04L 12/1822 |
| 2022/0086393 A1* | 3/2022 | Peters | H04N 7/147 |
| 2023/0080660 A1 | 3/2023 | Miletic | |

OTHER PUBLICATIONS

Apostolidis et al., "Video Summarization Using Deep Neural Networks: A Survey" (2021) (26 pages) (https://arxiv.org/pdf/2101.06072.pdf).

Haq et al., "Video summarization techniques: A review", International Journal of Scientific Technology Research, 9 (11):146-153 (2020).

He et al., "Deep residual learning for image recognition," IEEE/CVF Conference on Computer Vision and Pattern Recognition (CVPR) pp. 770-778 (2015).

Krizhevsky et al., "Imagenet classification with deep convolutional neural networks," Advances in Neural Information Processing Systems, pp. 1097-1105 (2012).

McMahan et al., "Federated Learning: Collaborative Machine Learning without Centralized Training Data", Google AI Blog (2017) (5 pages)(https://ai.googleblog.com/2017/04/federated-learning-collaborative.html).

Mujtaba et al., "Client-Driven Personalized Trailer Framework Using Thumbnail Containers", IEEE Access, vol. 8 (2020) (11 pages).

Simonyan et al., "Very deep convolutional networks for large-scale image recognition," International Conference on Learning Representations (2015) (14 pages).

Szegedy et al., "Going deeper with convolutions," in 2015 IEEE/CVF Conference on Computer Vision and Pattern Recognition (CVPR) (2015) (9 pages).

Szegedy et al., "Rethinking the inception architecture for computer vision," IEEE/CVF Conference on Computer Vision and Pattern Recognition (CVPR), pp. 2818-2826. (2016).

Wang et al., "Video affective content analysis: a survey of state-of-the-art methods," IEEE Transactions on Affective Computing 6.4:10-430 (2015).

Workie et al., "Digital video summarization techniques: A survey", International Journal of Engineering Research Technology, 9(1):81-85 (2020).

* cited by examiner

FIG. 2

SYSTEMS AND METHODS FOR DECENTRALIZED GENERATION OF A SUMMARY OF A VIRTUAL MEETING

CROSS-REFERENCE TO RELATED APPLICATION

This application is a continuation of U.S. patent application Ser. No. 18/093,575, filed Jan. 5, 2023, the disclosure of which is hereby incorporated by reference herein in its entirety.

BACKGROUND

This disclosure is directed to systems and methods for providing a summary of a portion of a virtual meeting to a user. In particular, the portion may correspond to a break in presence (BIP) at a first computing device of a first user from the virtual meeting, and the summary may be generated based on causing one or more second computing devices to locally monitor reactions of at least one second user to the virtual meeting during the BIP.

SUMMARY

Advancements in communication technology have allowed users to attend virtual meetings with colleagues, family, and friends located in different physical locations than the users, as well as virtually meet new friends, colleagues, classmates, and others with whom they might not be very familiar. For example, conferencing systems (e.g., Microsoft® Teams, Skype®, Zoom™, etc.) may be used to host online video meetings, with parties joining virtually from around the world for work, school, and/or recreation. Such video meetings enable colleagues in separate, geographically distributed physical locations to have a collaborative face-to-face conversation via a video conference, even if one or more of such users are on the go (e.g., utilizing a smartphone or a tablet).

Recently, there has been an explosion of conference-call activity, especially during the Covid-19 pandemic, during which a massive number of individuals worked (or attended school) remotely and had the need to connect with their colleagues (or classmates and professors) over a network-based video session. With so much time being spent participating in remote virtual meetings, it is likely that each user has, at one time or another, experienced a certain break in the presence (BIP). For example, any sudden decrease in data rate or increase in communication delay can adversely affect the users' experience (e.g., interrupt a video stream), which may cause a BIP event that can be detrimental to the user's experience and interfere with the goals of the collaborative meeting. As another example, users may require a break due to various personal and/or health reasons during certain collaborative tasks or meetings. To enable users having temporarily left the meeting to smoothly continue their collaborative tasks or meetings when they return from the BIP, it may be desirable to generate and provide a summary of the virtual meeting content that they missed.

In one approach, a central server analyzes other users' expressions to the content during the BIP to decide what parts of the missed content should be included in a summary to the missing user. However, having a central server perform all of this analysis may cause privacy issues in that the central server may store emotional data of users that such users did not consent to. Further, this approach may cause scalability problems, and may cause the central server to have to take on a large computational and storage burden. Moreover, in this approach, the central server may use a machine learning technique which requires the uploading of a large amount of raw data for training, which again causes concerns in terms of privacy, scalability, bandwidth, storage and computational burden for the central server.

Further, many virtual meeting participants keep their video and/or audio muted while another participant is presenting, such as to conserve upstream bandwidth, for privacy reasons, or scalability reasons, which makes it difficult or impossible for the central server to determine the reactions of such users to the virtual meeting. Such participants with their camera turned off and/or microphone muted will either not have their reaction data factor into a determination of which pieces of missed content are valuable or will have their privacy violated by capturing such data in a mode overriding their self-muting. If all (or most) parties to the meeting keep their image and sound private, there might not be enough data to determine, e.g., at a central server, which meeting segments are most important for a summary. There exists a need to collect data (e.g., from most meeting attendees) to identify important portions of content, for summarization purposes, without necessarily destroying privacy of each party.

To help overcome these problems, systems, apparatuses and methods are provided herein for detecting a break in presence (BIP) at a first computing device of a first user, the first computing device connected via a network to a server providing a virtual meeting, wherein one or more second computing devices are connected via the network to the server providing the virtual meeting and each of the one or more second computing devices corresponds to at least one second user. The systems, apparatuses and methods may further, in response to detecting the BIP, cause each of the one or more second computing devices to locally monitor reactions of the corresponding at least one second user to the virtual meeting during the BIP. The systems, apparatuses and methods may further receive, at the server, one or more parameters associated with each of the locally monitored reactions of the at least one second user from the corresponding one or more second computing devices, wherein each of the one or more parameters corresponds to a portion of the virtual meeting during the BIP. The systems, apparatuses and methods may determine, based on the received one or more parameters, whether to generate a summary associated with a corresponding portion of the virtual meeting during the BIP. The systems, apparatuses and methods may, in response to determining to generate a summary associated with a corresponding portion of the virtual meeting during the BIP, generate the summary. The summary may be provided to the first computing device of the first user.

Such aspects provide for a decentralized approach for intelligently summarizing the most important or relevant portions of a virtual meeting during a BIP event and providing such a summary to a user associated with the BIP event. The disclosed techniques may enable preserving user privacy in that only partial or anonymized data of the at least one second user's reactions may be transmitted to a central server facilitating the virtual meeting, and may further alleviate the heavy storage and computational burden for the server (particularly when a large number of computing devices are participating in the virtual meeting) by distributing storage and computational tasks associated with determining whether to generate the summary to computing devices of virtual meeting participants. For example, the parameters received by the server may comprise an indication of a number of users having reacted to a portion of the virtual meeting during the BIP, types of reactions of such users at a particular timestamped portion of the virtual meeting, and/or importance scores associated with a particular portion of the virtual meeting, or any other suitable indicator of user's reactions. In some embodiments, the parameters received by the server may comprise parameters determined or learned locally (e.g., in association with a machine learning model implemented at a user's computing device) for updating a machine learning model stored at the server. In some embodiments, the parameters received by the server may comprise an indication of timestamped moments in the virtual meeting determined to be important during the BIP period, as well as independently receive parameters (e.g., updated weights) for the machine learning model implemented at the central server. In some embodiments, the generated summary may be anonymized with respect to at least one second user's reactions, or may include such reactions.

In some embodiments, detecting the BIP comprises at least one of detecting that the first user has exited a vicinity of the first computing device, detecting that a microphone of the first computing device has been muted, detecting that a camera of the first computing device has been disabled, detecting an error associated with the network connection between the first computing device and the server, or detecting an error associated with the first computing device.

In some embodiments, the virtual meeting is an extended reality (XR) session, a video communication session, an audio communication session, a chat communication session, or any combination thereof.

In some embodiments, generating the summary further comprises determining to generate a summary based at least in part on a reaction of a particular user of the at least one second user, wherein a microphone of a second computing device of the particular user is disabled, and/or a camera of the second computing device of the particular user is disabled, with respect to the virtual meeting. For example, the virtual meeting platform may not have access to video or audio data associated with the at least one second user of such second computing device. However, the microphone and/or camera of the second computing device may be enabled locally to capture audio or video for local analysis of the at least one second user's reactions during the BIP at the second computing device, and the computing device may notify the central server of certain reaction data without transmitting the analyzed raw data (e.g., the locally captured video, audio and/or text) itself. While a central server generally may not be able to access muted and camera-off users' reactions to a virtual meeting, a machine learning model trained and deployed locally at a user's device may analyze raw audio or video data (e.g., the microphone or camera of the computing device or an external device may only be capturing audio or video for local use, or other actions may be locally analyzed), with the user's implicit or explicit consent. Parameters indicative of the locally monitored user data such as audio, video, chat, or any other suitable data, or any combination thereof, may be shared by the second computing device with the server, to assist in selecting optimal portions of the virtual meeting to summarize while preserving privacy of the at least one second user.

In some embodiments, generating the summary further comprises determining whether to include a reaction of a particular user of the at least one second user in the summary based on comparing a location of the particular user to a location of the first user. For example, a virtual meeting may comprise a number of users, a subset of which may be friends or colleagues who share similar tastes and commonalities, e.g., similar interests, senses of humor, and culture. The systems, methods and apparatuses described herein may have such commonalties, which may differ based on users' demographics, background, culture, and locations, to inform which portions of the virtual meeting should be included in summary of the BIP for the first user associated with the BIP.

In some embodiments, a user who temporarily leaves a virtual meeting or otherwise is associated with a BIP event may inform a friend (e.g., via a chat of the virtual meeting or via a mobile device) of this, and the systems and methods disclosed herein may analyze such friend's behavior during the BIP, e.g., by give more weight to the friend's behavior during the BIP as compared to other participants in the virtual meeting. In some embodiments, the systems and methods disclosed herein may automatically detect close friends of the user experiencing the BIP or other users associated with the user experiencing the BIP, e.g., by analyzing historical behavior of the user on the virtual meeting platform and/or on other platforms (e.g., call history on a telephone platform, social media interactions on a social media platform, email communications on an email platform, or any other suitable platform or any combination thereof).

In some embodiments, the systems, methods and apparatuses described herein may generate an importance score based on the reactions of the at least one second user to the virtual meeting during the BIP, wherein determining whether to generate the summary associated with the portion of the virtual meeting may be based at least in part on the importance score. In some embodiments, an importance score may be determined based on local monitoring of each user's computing device, at one or more central servers monitoring one or more user's data feeds, or with a combination of local devices and central servers based on, e.g., whether each user's camera feed and/or microphone is turned on.

In some embodiments, causing each of the one or more second computing devices to locally monitor reactions of the corresponding at least one second user to the virtual meeting during the BIP comprises causing each of the one or more second computing devices to capture video data and/or audio data of the corresponding at least one second user during the BIP, and to locally process the video data and/or audio data. In some embodiments, the captured raw video data and/or raw audio data itself may not be included in the one or more parameters associated with the reactions of the at least one second user transmitted to the server. For example, certain data may be locally analyzed (e.g., associated with computing devices remaining in the virtual meeting during the BIP and having cameras or microphones disabled with respect to the central server of the virtual meeting) without being sent to the central server.

In some embodiments, the one or more parameters associated with the reactions of the at least one second user transmitted to the server comprises an indication of a number of users that reacted to the portion of the of the virtual meeting during the BIP, or comprises an indication of one or more types of the reactions to the portion of the virtual meeting during the BIP.

In some embodiments, causing each of the one or more second computing devices to locally monitor reactions of the corresponding at least one second user to the virtual meeting during the BIP is performed using at least one machine learning model of machine learning models respectively implemented at the one or more second computing devices. Each machine learning model may be trained at least in part at a corresponding computing device of the one or more second computing devices. In some embodiments, given such an arrangement, individual clients can collaboratively learn a shared model (e.g., using federated learning techniques) without compromising confidentiality or privacy of users. In some embodiments, such a federated learning approach may prioritize model parameters (e.g., more heavily weight or bias parameters) for virtual meeting participants who more frequently attend, or more frequently react to portions of, virtual meetings, as compared to other users.

In some embodiments, the server implements a global machine learning model, and the one or more parameters associated with the reactions of the at least one second user transmitted to the server comprises an update to one or more parameters of the global machine learning model. The server may update one or more parameters of the global machine learning model based on the received one or more parameters and transmit the updated one or more parameters to each of the one or more second computing devices and the first computing device of the first user. For example, the parameters may be used to improve the global machine learning model.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

FIG. 2 depicts illustrative classifications of reactions of users during a virtual meeting, in accordance with some embodiments of this disclosure.

DETAILED DESCRIPTION

Figure 1:
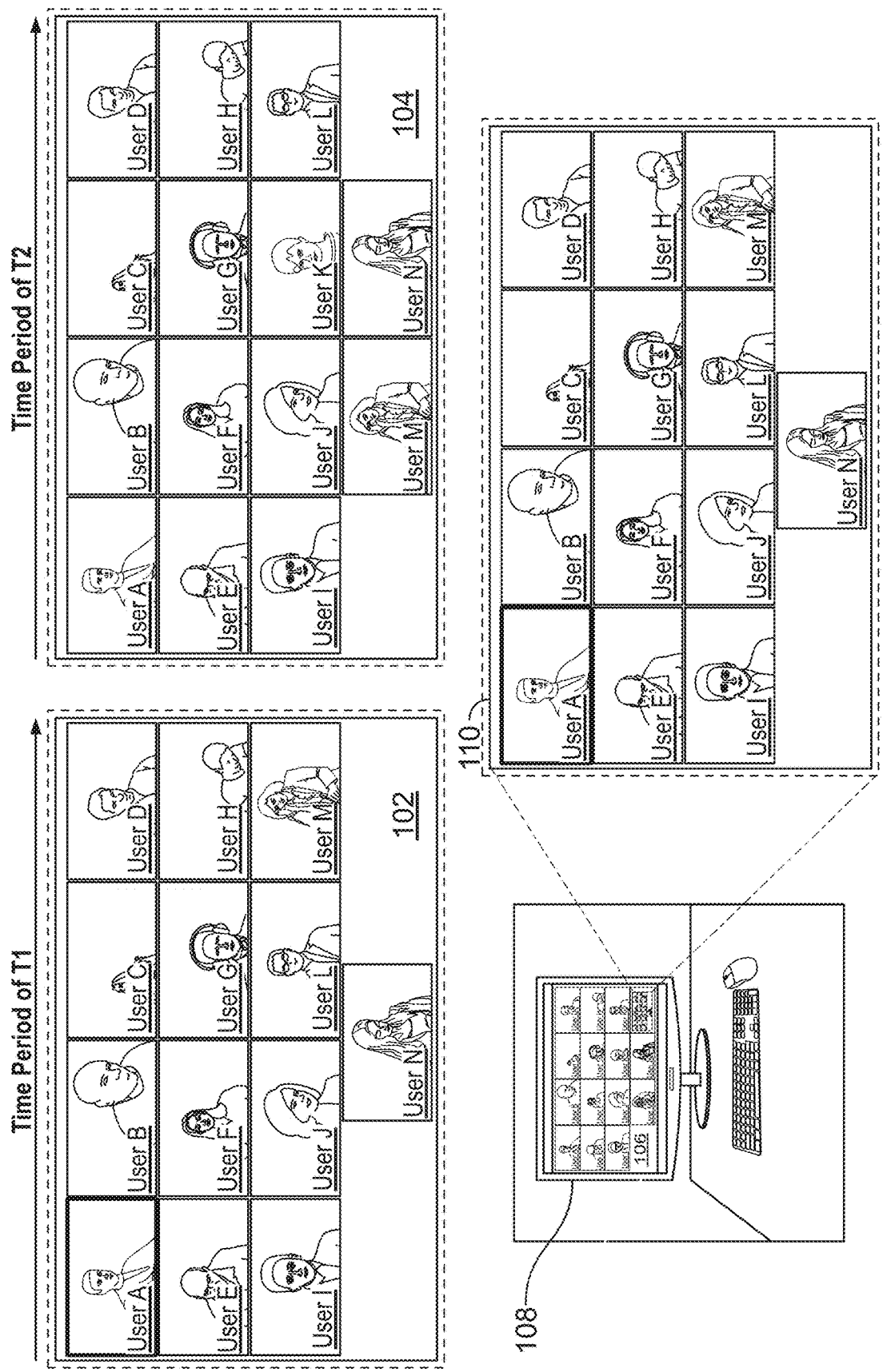
FIG. 1 depicts illustrative user interfaces for providing a summary of a portion of a virtual meeting to a user, in accordance with some embodiments of this disclosure.

FIG. 1 depicts illustrative user interfaces for providing a summary of a portion of a virtual meeting to a user, in accordance with some embodiments of this disclosure. User interfaces 102, 104 and 106 may be provided at least in part by a summary generator application. The summary generator application may be executing at least in part at a first computing device (e.g., computing device 108 associated with User K) and one or more second computing devices (e.g., computing devices respectively associated with User A, B, C, D, E, F, G, H, I, J, L, M, and N of FIG. 1) and/or at one or more remote servers and/or at other computing devices. The summary generator application may be configured to perform the functionalities described herein. The summary generator application may correspond to or be included as part of a summary generator system, which may be configured to perform the functionalities described herein. In some embodiments, the summary generator system may comprise the summary generator application, one or more extended reality (XR) applications, one or more video communication applications and/or audio communication applications and/or other communication applications, one or more streaming media applications, one or more social networking applications, any suitable number of displays, sensors or devices such as those described in FIGS. 1-9, or any other suitable software and/or hardware components, or any combination thereof.

In some embodiments, the summary generator application may be installed at or otherwise provided to a particular computing device (e.g., computing device 108 of FIG. 1), may be provided via an application programming interface (API), or may be provided as an add-on application to another platform or application (e.g., a video communication application, a streaming platform, a media platform, an extended reality (XR) application, a video game platform, an email platform, or any other suitable platform or application any combination thereof). In some embodiments, software tools (e.g., one or more software development kits, or SDKs) may be provided to any suitable party, to enable the party to implement the functionalities as discussed herein.

XR may be understood as augmented reality (AR), virtual reality (VR), or mixed reality (MR) or any combination thereof. VR systems may fully immerse a user (e.g., giving the user a sense of being in an environment) or partially immerse a user (e.g., giving the user the sense of looking at an environment) in a three-dimensional (3D), computer-generated environment. AR systems may provide a modified version of reality, such as enhanced information overlaid over real world objects. MR systems map interactive virtual objects to the real world. Such systems may utilize wearables, such as a head-mounted device, comprising a stereoscopic display, or smart glasses.

In some embodiments, the virtual meeting may be a computer-generated session, such as, for example, a video communication session, a video call or video conference, an audio call, an audio communication session, a chat communication session, an XR session, an XR meeting, an XR game, a multi-player video game, a watch party of a media asset, or any other suitable communication session, or any combination thereof, as between any suitable number of users. As referred to herein, the term "media assets" may be understood to refer to electronically consumable user assets, e.g., television programming, as well as pay-per-view programs, on-demand programs (as in video-on-demand (VOD) systems), internet content (e.g., streaming content, downloadable content, webcasts, etc.), XR content, video clips, audio, playlists, websites, articles, electronic books, blogs, social media, applications, games, and/or any other media or multimedia, and/or combination of the above.

The summary generator system may be configured to establish the virtual meeting over a network (e.g., network 909 of FIG. 9) between a first computing device 108 (associated with a first user, User K) and one or more second computing devices of at least one second user (e.g., computing devices respectively associated with User A, B, C, D, E, F, G, H, I, J, L, M, and N of FIG. 1). In some embodiments, at least two of such users may be participating in the virtual meeting via a same computing device (e.g., in a conference room of an office). First computing device 108 and the computing devices of at least one second user may be, for example, a mobile device such as a smartphone or tablet, a laptop computer, a personal computer, a desktop computer, a smart television, a smart watch or wearable device, smart glasses, a stereoscopic display, a wearable camera, virtual reality (VR) glasses, VR goggles, a smart watch or wearable device a stereoscopic display, augmented reality (AR) glasses, an AR head-mounted display (HMD), a VR HMD or any other suitable computing device, or any combination thereof. In some embodiments, the computing device may include or be used in conjunction with any other suitable sensors or equipment, e.g., VR haptic gloves, to provide a realistic touch sensation, a VR remote controller, a VR baseball bat or golf club or other suitable VR item, a VR body tracker, and/or any other suitable sensor or equipment. The virtual meeting may correspond to or facilitate a two-dimensional (2D) or 3D interactive environment, or any other suitable environment.

Figure 2:
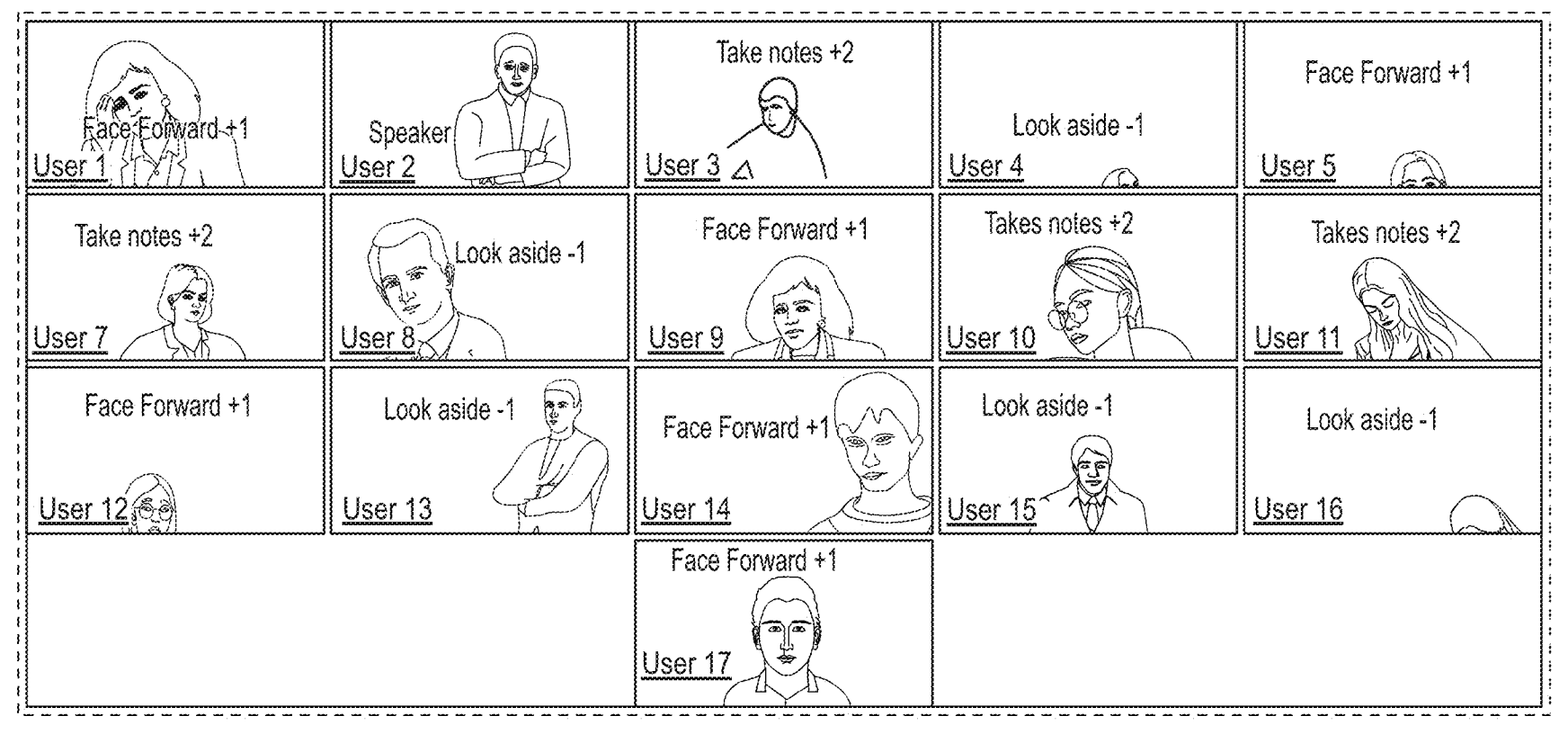

In the example of FIGS. 1-2, the virtual meeting may be a video conference or a video communication session. The summary generator system may enable computing device 108 (of User K) and the computing devices of Users A-J and Users L-N to receive and transmit over a network (e.g., network 909 of FIG. 9) audio signals, video signals, images, textual data, emojis, and/or any other suitable data, in connection with the virtual meeting. For example, such audio signals may be spoken by a particular user and/or may be other audio present in the environment surrounding the particular user and may be detected by a microphone of a computing device participating in the virtual meeting. The images may be still images and/or video, captured by a camera of a computing device of a particular user (or other camera external to the computing device) to depict a digital representation of a particular user and/or the environment surrounding such user. In some embodiments, the summary generator system may provide messaging and chat functions to allow users to interact with each other.

In some embodiments, the environment depicted behind a user (e.g., as seen by that user and/or any suitable number of other users during the virtual meeting) may generally (e.g., as a default setting) correspond to an actual physical environment (e.g., an office inside an office building, a home office, a basement, a public setting, or any other suitable environment). In some embodiments, the summary generator system may generate for display a virtual background to completely replace or partially replace the physical background of a user. For example, the summary generator system may generate for display a virtual background behind User M corresponding to grass or plants.

Figure 9:
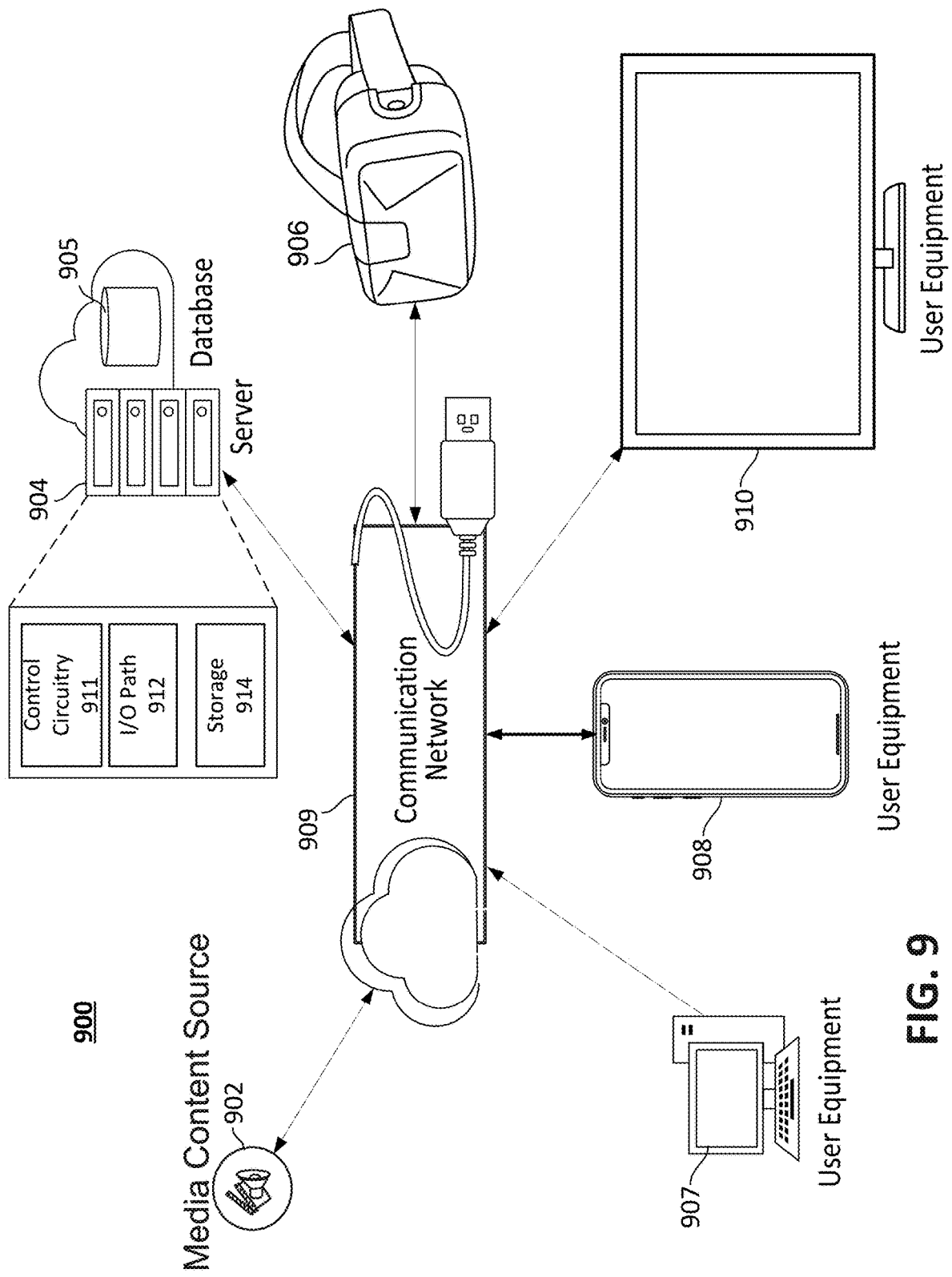

In some embodiments, the virtual meeting may be hosted by one or more remote servers (e.g., server 904 of FIG. 9). In some embodiments, the virtual meeting may be scheduled for a particular time or may be spontaneously created at the request of a user, with any suitable number of participants. In some embodiments, each user may access the virtual meeting via a connected computing device (which may be equipped with or otherwise proximate to a camera and a microphone) accessing one or more of a web address or virtual room number, e.g., by entering his or her username and password. In some embodiments, one or more users may be a moderator or host, where a designated moderator may have the task of organizing the meeting and/or selecting the next participant member to speak or present. In some embodiments, the summary generator system may be utilized to record content, which may be transmitted in real time (e.g., live-streamed) to other users. In some embodiments, the video may be recorded, stored and transmitted at a later time to other users and/or posted to any suitable website or application (e.g., a social network, video sharing website application, etc.) for consumption by other users.

In some embodiments, video data and audio data associated with the respective virtual meeting participants may be transmitted separately during the virtual meeting, along with a header or metadata (e.g., time stamps). Such header or metadata may enable synchronization of the audio and video data at the destination computing device, or audio and video data may be combined as a multimedia data stream. In some embodiments, any suitable audio or video compression and/or encoding techniques may be utilized. Such techniques may be employed prior to transmitting the audio and/or video components of the virtual meeting from a computing device to a server. In some embodiments, at least a portion of such video compression and/or encoding may be performed at one or more remote servers (e.g., an edge server and/or any other suitable server). In some embodiments, the receiving or rendering computing device may perform decoding of the video and/or audio data or multimedia data stream upon receipt, and/or at least a portion of the decoding may be performed remote from the receiving computing device. In some embodiments, Users A-N may be located in the same or different geographical locations (e.g., within the same office or country or different countries), and the virtual meeting may be assigned a unique virtual meeting identifier. Depictions of the users participating in the virtual meeting may be arranged in any suitable format (e.g., to depict a current speaker only, to depict each conference participant including the user himself or herself, a subset of the conference participants, etc.).

The summary generator system may be configured to generate for display an indication of a username (e.g., User A) associated with a user profile or user account of User A associated with the interactive application (or an account or profile of the user with another service, e.g., a social network), and a digital representation of User A. In some embodiments, an indication of usernames (e.g., Users A-User N) associated with user profiles or user accounts of other users may be generated for display, along with a corresponding digital representation. In some embodiments, the summary generator system may generate for display an indication of a total duration of and/or an elapsed time of the virtual meeting. In some embodiments, the summary generator system may generate for display a selectable option to mute the user's own microphone and/or a selectable option turn off the user's own camera, a chat function, and any other suitable type of selectable options or information.

In some embodiments, each digital representation may correspond to a digital replica of facial and/or other bodily features or other elements of the appearance of the user, optionally modified by, e.g., XR portions or modified or altered with other suitable content or effects. In some embodiments, a digital representation may correspond to an avatar. The avatar may correspond to any suitable digital representation of a user, e.g., a replica of the user (e.g., as shown in FIG. 1), an XR avatar (e.g., as shown in FIGS. 4A-4B), an animated or "cartoon" representation of a user, a memoji or emoji, or any other suitable digital representation, or any combination thereof. In some embodiments, the avatar for a particular user may resemble the user (e.g., facial and/or bodily features, clothing, etc.) or may not resemble the user (e.g., the user may like dogs and choose a digital representation of a dog has his or her avatar). In some embodiments, the summary generator system may detect the real-world movements and actions of a user and cause the avatar to mimic such real-world movements and actions, e.g., to interact with objects or other avatars in an XR environment.

User interface 102 may be associated with a time period T1 during which a break in presence (BIP) event is detected in association with a particular user's (e.g., User K's) computing device participating in an on-going virtual meeting (in which Users A-J and L-N are participating). For example, computing device 108 of User K may have been participating in the virtual meeting at a time prior to time period T1, and the BIP for User K may have been detected during time period T1. In some embodiments, time period T1 may correspond to a time period during which computing device 108 of User K unsuccessfully attempted to initially join the virtual meeting, e.g., at the beginning of the virtual meeting or at another portion of the virtual meeting. During time period T1, one or more servers (e.g., server 904 of FIG. 9) may be providing the virtual meeting via a network connection (e.g., over network 909 of FIG. 9) to computing device 108 and one or more other computing devices each corresponding to at least one of Users A-J and User L-N. In some embodiments, each of Users A-J and Users L-N may be participating in the virtual meeting using a respective device, or at least a subset of such users may be participating in the virtual meeting via a shared device (e.g., in a conference room).

In some embodiments, the BIP event may be detected based on monitoring conditions of a network (e.g., a network connection of computing device 108 to a server facilitating or providing the virtual meeting). For example, the summary generator system may detect, based on communication network feedback, that computing device 108 is experiencing a BIP event caused by network problems or errors. In some embodiments, a remote server (e.g., server 904 of FIG. 9) rendering or facilitating the virtual meeting to a plurality of participant's devices may receive such feedback for detecting the error from computing device 108, e.g., indicating network signal strength being experienced by computing device 108, quality-of-service characteristics (e.g., available bandwidth, error rate, bit rate, throughput lag, transmission delay, latency, availability, or jitter) associated with computing device 108 or any other suitable parameters, or any combination thereof. In some embodiments, if the remote server fails to receive a response, and/or audio or video or text data, from a computing device previously participating in the virtual meeting, the summary generator system may determine that the BIP (e.g., the user's device has been dropped) associated with such device has occurred. In some embodiments, the BIP event may be detected based on an error associated with computing device 108 (e.g., computing device 108 running out of battery power, computing device 108 failing to connect to the network, computing device 108 failing to have proper updates installed, or any other suitable error, or any combination thereof).

In some embodiments, the summary generator system may detect the BIP for computing device 108 based on receiving an explicit input from a user (e.g., via a touch screen or keyboard or mouse click or via a voice input or any other via suitable input or any combination thereof). Such input may indicate that User A needs to temporarily leave the virtual meeting (e.g., to use the restroom or answer the front door of his or her home or retrieve food or a beverage or for any other suitable reason). For example, computing device 108 may receive selection of an icon, or voice input of, "I need to take a break," or "I'll be right back." In some embodiments, the summary generator system may detect the BIP based on detecting that the user of computing device 108 has selected an option to temporarily exit the virtual meeting, or that User K has answered a separate call or joined another virtual meeting on computing device 108 or another computing device.

In some embodiments, the summary generator system may detect the BIP based on detecting an activity (e.g., movements and/or behavior) of the user and may infer based on such activity that a BIP has occurred at computing device 108 for User K. For example, the summary generator system may determine, based on one or more sensors included in or associated with or external to computing device 108, that User K has exited the vicinity of computing device 108 at which he or she is participating in the virtual meeting. As an example, the summary generator system may compare (e.g., using computer vision techniques or any other suitable technique) a prior frame of a user (e.g., depicting User K and captured by a camera of computing device 108) to a current frame captured by User K's device (which may be dark or from which User K may now be absent) to determine that User K has exited the vicinity of computing device 108. In some embodiments, to avoid a brief user absence triggering a BIP event, the summary generator system may use a timer to measure, and wait for, User K being absent from the frame (and/or wait for an absence of audio input from User K) for a threshold period of time (e.g., 10 seconds or any other suitable threshold) prior to detecting the BIP event. In some embodiments, the BIP may be determined based on the camera of the user's device being disabled, and/or a microphone of the user's device being muted or disabled, for at least a threshold period of time. In some embodiments, aa BIP may be detected based on live feedback from external motion sensors (e.g., security cameras or other external sensors or devices) external from computing device 108, which may be detecting the movement or other activity of the user to another portion of the user's environment.

In some embodiments, the summary generator system may detect a BIP based at least in part on one or more techniques used to detect an interruption discussed in application Ser. No. 16/950,397, filed Nov. 17, 2020 and naming Rovi Guides, Inc as Applicant, the contents of which are hereby incorporated by reference herein in their entirety. In some embodiments, the summary generator system may detect a BIP based at least in part on identifying locations of the user and/or devices in the environment based on determined wireless signal characteristics, e.g., channel state information (CSI), received signal strength indicator (RSSI) and/or received channel power indicator (RCPI), as discussed in more detail in application Ser. No. 17/481,931 filed Sep. 22, 2021 and naming Rovi Guides, Inc. as Applicant, the contents of which are hereby incorporated by reference herein in their entirety.

User interface 104 may be associated with a time period T2 during which a computing device (e.g., computing device 108) of a particular user (e.g., User K's) resumes participation in an on-going virtual meeting (in which one or more devices corresponding to Users A-J and User L-N are participating). In some embodiments, the summary generator system may determine that computing device 108 of User K has re-joined or joined the virtual meeting including other participant(s) (e.g., Users A-J and Users L-N), based on receiving an indication from User K's computing device 108 and/or a central server regarding the re-joining; based on receiving input from User K (e.g., voice input or other input of "I'm back" or any other suitable input); based on detecting network conditions have improved; a based on determining that an error or network error associated with computing device 108 has been rectified to allow resumption of the virtual meeting; based on sensor data indicating the BIP has otherwise ended (e.g., the user has returned from the restroom or from answering the door); or based on any other suitable criteria; or based on any combination thereof.

It may be desirable to provide a summary to User K of one or more portions of the virtual meeting that occurred during the BIP (e.g., during time period T1) to update User K on what he or she missed in the virtual meeting during the BIP of User K's computing device 108. Based on determining that the BIP has ended, and/or that User K's device is again participating in the virtual meeting, the summary generator system may determine whether to generate and provide to User K a summary of a portion of the virtual meeting that occurred during the BIP (e.g., during time period T1), as discussed in more detail below. As shown in FIG. 1, if the summary generator system determines to generate such a summary, user interface 106 may be caused to include the generated summary 110. Summary 110 may be provided to computing device 108 of User K at any suitable time (e.g., during time period T2 or any other remaining time period during the virtual meeting or after the virtual meeting ends). In some embodiments, the summary may comprise video or image snippets from the virtual meeting during the BIP, or a transcription of audio during the BIP associated with the virtual meeting, of moments having been deemed sufficiently important to be included in summary 110.

In some embodiments, summary 110 may be automatically provided to computing device 108, or User K may be prompted with an option (or may be transmitted an email or text message or other electronic message with a link) to view summary 110. Summary 110 may comprise any suitable form of content (e.g., images, video, audio, text, metadata or any other suitable content or any combination thereof) associated with a portion of the virtual meeting during the BIP. In some embodiments, at least a portion of the virtual meeting prior to the BIP may be included in summary 110 to provide context for summary 110 within the virtual meeting.

In some embodiments, summary 110 may comprise video content, visual content, audio content, users' spontaneous responses, emotional descriptors, and their associations, or any other suitable content, or any combination thereof. Emotional descriptors may capture the users' subjective assessment of the virtual meeting during the BIP. The users' spontaneous responses may include users' visual behavioral responses while participating in the virtual meeting during the BIP.

In some embodiments, the summary generator system may receive instructions from the user regarding which users voices or actions, or which topics, of the virtual meeting should be included in the summary. For example, the summary generator system may compare the profile of User K experiencing the BIP to other user profiles and may weight speaking or actions by user's sharing common interests with the user more heavily than other users sharing fewer common interests, for inclusion in the summary. In some embodiments, the summary generator system may determine that User K experiencing the BIP and another user remaining in the virtual meeting share a common interest or home location (e.g., Finland) and thus may weight portions of the virtual meeting including speaking or actions by such user, or portions likely to interest a user from such shared location, in the summary for a BIP user. For example, attendees sharing a similar location may be fond of the same sports team and a nearby attendee's reaction in a virtual meeting discussing sports may be more important for a summarizing effort than an attendee living very far away. In some embodiments, the summary generator system may receive a voice or other input from a user indicating, e.g., "I have to go now but please include any discussions about the XYZ matter in a summary," or "I have to go now but please include any discussions from User 13 in the summary," and the summary generator system may search for the specified topics, or discussions by the specified users, for inclusion in the summary. For example, in some embodiments, learned parameters by a machine learning model (e.g., model 300 of FIG. 3) may be biased towards parameters of friends or closest friend's of a particular user, e.g., dependent on how close of a friend the other user is to the particular user.

FIG. 2 depicts illustrative classifications of reactions of users during a virtual meeting, in accordance with some embodiments of this disclosure. For example, based on detecting the BIP (e.g., during time period T1 of FIG. 1), the summary generator system may monitor and analyze in real-time one or more reactions of one or more users in the ongoing virtual meeting. Such reactions may be in the form of audio uttered by users, voice reactions of users, body posture of users, body language of users, facial expressions of users, behavior of users, gestures of users, text input by users, or actions of users, or any combination thereof, performed by each of the user's that remain as participants in the virtual meeting. In some embodiments, the reactions may be measured in the form of biometric signals (e.g., heart rate), or any other suitable technique may be employed, or any combination thereof. In some embodiments, a remote server (e.g., server 904 of FIG. 9) may cause one or more devices (e.g., corresponding to one or more users remaining in the virtual meeting) to locally detect, capture and process such information at each respective device. For example, a remote server (e.g., server 904 of FIG. 9) may transmit such instructions over a network (e.g., network 909 of FIG. 9) instructing each of the computing devices of the virtual meeting participants to capture and analyze reactions of the corresponding participant during the BIP. The summary generator system may monitor, analyze, process and/or characterize the reactions of the users using any suitable computer-implemented technique, such as, for example, machine learning techniques, and/or heuristic-based analysis (e.g., determining similarity between captured images or audio or other signals by comparing such information to known information stored in a database).

In the example of FIG. 2, Users 1-5 and Users 7-17 may be participating in the virtual meeting via a plurality of computing devices, and a computing device of one or more other users (e.g., User 6, not shown in FIG. 2, and shown at 701 of FIG. 7) may have experienced a BIP in association with the virtual meeting. For example, in response to detecting the BIP, one or more computing device(s) corresponding to Users 1, 5, 9, 12, 14 and 17 may locally monitor and determine (e.g., based on a captured images using a camera of each computing device) that each of User 1, 5, 9, 12, 14 and 17 is facing forward during a particular portion (e.g., a particular timestamp or time period) of the virtual meeting during the BIP. A computing device corresponding to User 2 may determine that User 2 is the speaker (e.g., a main speaker for the virtual meeting such as a professor or teacher of a class or lecture or a keynote speaker, and/or a current speaker). As another example, in response to detecting the BIP, one or more device(s) corresponding to Users 3, 7, 10, and 11 may locally monitor and determine that each of User 3, 7, 10, and 11 is taking notes during a particular portion of the virtual meeting during the BIP. As another example, in response to detecting the BIP, one or more device(s) corresponding to Users 4, 8, 13, 15 and 16 may locally monitor and determine that each of User 4, 8, 13, 15 and 16 is looking aside during a particular portion of the virtual meeting during the BIP. In some embodiments, determining a particular reaction, such as, for example, a posture or action or gesture (e.g., facing forward, looking aside or taking notes) to the virtual meeting may comprise determining that such posture or action or gesture is maintained or performed for a threshold period of time (e.g., 5 seconds or any other suitable time) consecutively or non-consecutively during the BIP.

The summary generator system may determine whether to include one or more portions of the virtual meeting during the BIP in a summary based at least in part on the user's detected reactions, to provide an accurate summary of such missed content. For example, users taking notes or facing forward or exhibiting certain facial expressions (e.g., smiling) or gestures (e.g., nodding) or users asking questions or engaging in conversation about a particular topic during a particular portion of the virtual meeting during the BIP may indicate the importance of the particular portion of the virtual meeting. The summary generator system may enable one or more devices corresponding to users remaining in the virtual meeting during the BIP to generate, in a decentralized manner, one or more importance scores for a particular time point of the virtual meeting, based on evaluating the user's reactions at such time point, and such importance score may be usable to generate a summary of virtual meeting content. For example, perception-based summaries can be made locally using the facial or verbal expressions of the participant to identify the most important parts in virtual meetings.

In some embodiments, User 2, e.g., the professor or teacher, may be provided in real-time or subsequent to the virtual meeting a report of the user's reactions during the virtual meeting he or she was conducting, e.g., as detected during the BIP or as detected otherwise during the virtual meeting. For example, the report may be a summary of key moments of the virtual meeting along with the student user's reactions, or a listing of a score of the various user's reactions, which may assist the teacher in determining which users were paying attention and/or whether the teacher should make any changes to his or her style to further engage the students. In some embodiments, the summary generator system may receive a request from User 2 to generate such a summary of an entire virtual meeting or subset thereof, which may be treated as a BIP for the purposes of collecting behavioral and/or emotional data of users participating in the virtual meeting.

In some embodiments, the summary may include all user's reactions and/or behaviors (or a subset of user's reactions and/or behaviors) during the BIP associated with the virtual meeting. Alternatively, in some embodiments, the summary can be presented in a manner that is anonymized, e.g., key moments may be presented without tagging or showing specific users, rather than presenting an aggregate of users' reactions. In some embodiments, the summary may include only the main speaker or presenter (e.g., User 2) and/or content (e.g., being shared via a shared screen), and excluding reactions of other attendees of the virtual meeting. In some embodiments, whether a particular user's reactions are included in the summary may depend on whether such user has provided his or her consent. In some embodiments, for users not having provided consent, or for users having their computing device's video and/or audio disabled (with respect to the virtual meeting platform, e.g., the data is not provided to the central server) during the BIP, such user's reactions may not be included in the summary. In some embodiments, reactions of such users having not provided consent, or reactions of such users having their computing device's video and/or audio disabled (with respect to the virtual meeting platform) may nonetheless be used to determine key or important moments of the virtual meeting during the BIP to be included in the summary, even if such user's reactions are excluded from the summary. For example, user's remaining in the virtual meeting during the BIP may have their audio or video or text or any other suitable data or any combination thereof captured locally for local analysis, even if the microphone and/or camera of such device is disabled with respect to the virtual meeting platform. In some embodiments, if one or more users have a computing device camera turned on or audio turned on, the summary can be presented including all of the user's reactions or a subset other users' reactions as a representative sample. In some embodiments, partial anonymization may offer privacy for only concerned users, e.g., user's having not consented or having opted out of having their appearances included in summaries.

In some embodiments, for users having their device's camera off or disabled and/or having their device's microphone off or muted (e.g., completely turned off with respect to the central server), the summary generator system may cause such users to be monitored locally (e.g., by a camera and/or microphone of the user's device and/or an external device in a vicinity of the user's device) during the virtual meeting. For example, one user (e.g., a professor or teacher) may ask other users to disable their video and/or audio to conserve bandwidth during the virtual meeting, or users may decide for privacy reasons to disable their video and/or audio during the virtual meeting. Even though video, audio and/or text of users in these circumstances may not be provided to the central server, the users reactions may be locally analyzed, and an indication of such analysis may be transmitted to the central server. On the other hand, for other users in the virtual meeting, a central server may monitor reactions of users whose computing device's camera and/or microphone is not turned off. In some embodiments, the summary generator system may determine portions of a virtual meeting to be included in a summary during a BIP for a user based on a combination of such locally monitored reactions (for user devices being muted or having a disabled camera) as well as reactions determined by the central server (for user devices not having the camera and/or microphone turned off, disabled or muted).

In some embodiments, the decentralized nature of the summary generator system may enable users' reactions to be analyzed locally (e.g., at computing devices associated with at least one of Users 1-5 and Users 7-17), and one or more importance scores to be generated locally, during the BIP of the virtual meeting. This may alleviate a remote server's (e.g., server 904 of FIG. 9) burden of determining such reactions and computing importance scores (e.g., having to analyze the raw audio or image data or other sensor data corresponding to the reactions) for a potentially large number of computing devices participating in the virtual meeting. The computing devices may share one or more parameters associated with the locally analyzed reactions with the remote server. For example, the parameters may summarize the reactions of Users 1-5 and Users 7-17 during the BIP (e.g., by providing anonymized indications of a number of users reacting generally or reacting in a certain manner), which may help preserve privacy of users. For example, the computing devices may be given permission via implicit or explicit user consent to analyze the raw data of the reactions of specific users, but the central server may not be provided such permission.

As shown in FIG. 2, in some embodiments, the summary generator system may pre-label or weight the frame of videos of the users (or audio uttered by users or any other detected information) as "important" or "not important" or otherwise weight the importance level. For example, a frame in which a user is determined to be looking forward may be assigned a weight of +1, a frame in which a user is determined to be taking notes may be assigned a weight of +2, and a frame in which a user is determined to be looking aside such as left or right may be assigned a weight of −1. Such weighting may enable the summary generator system to determine the importance of one or more time points or portions of a virtual meeting based at least in part on one or more users' reactions or expressional behaviors or an aggregation of multiple users' reactions or behaviors. In the example of FIG. 2, a particular time's overall importance score of the virtual meeting may be a summation of the weights, which in this case is 9 (e.g., adding together +1, +2, −1, +1, +2, −1, +1, +2, +2, +1, −1, +1, −1, −1, +1). In some embodiments, a particular time's overall importance score may be computed using any other suitable technique, e.g., mean, median, mode, on a per user basis, weighting certain users higher than others, weighting certain topics or subjects being discussed or presented during the virtual meeting higher than others, or any other suitable technique, or any combination thereof. In some embodiments, the importance score may be compared to a threshold value (e.g., 5 or any other suitable value), and a time point of the virtual meeting during the BIP may be determined to be sufficiently important if the importance score exceeds the threshold. In some embodiments, the threshold value may vary depending on the number of users participating, based on a type of the virtual meeting, or based on the technique used to generate overall score (e.g., a summation technique may have a greater threshold than an averaging or mean technique) or based on any other suitable criteria or any combination thereof.

In some embodiments, the summary generator system may compute an importance score based on user reactions in sequential fragments, in determining which portions of the virtual meeting during the BIP should be included in the summary. For example, starting from a time point after User 6 (e.g., shown at 701 of FIG. 7) experiences a BIP, the summary generator system may score the remaining users' expressions fragment-wise until the time point at which the BIP of User 6 ends and User 6 returns to the virtual meeting. As a non-limiting example, a duration of the BIP may be 2 fragments long and each fragment may comprise 5 sequential time frames. If the summary should comprise, from among the 10 sequential time frames, 3 total frames, the summary generator system may select a time interval of sequential frames at which the remaining user's exhibit the highest importance score.

In some embodiments, the virtual meeting may correspond to a watch party in which a plurality of computing devices may be connected over a network to a streaming provider, e.g., to consume a media asset together. In some circumstances, the streaming provider's watch party may include a video feed and/or audio feed for the users and/or chat function for the users to interact with each other. Even if the streaming provider's watch party only provides for a chat function while the media asset plays in the foreground, the summary generator system may analyze sentiment and/or content of user's chat messages during a BIP event, and/or content of the media asset, when generating a summary to a user having experienced the BIP event during the watch party.

Figure 3:
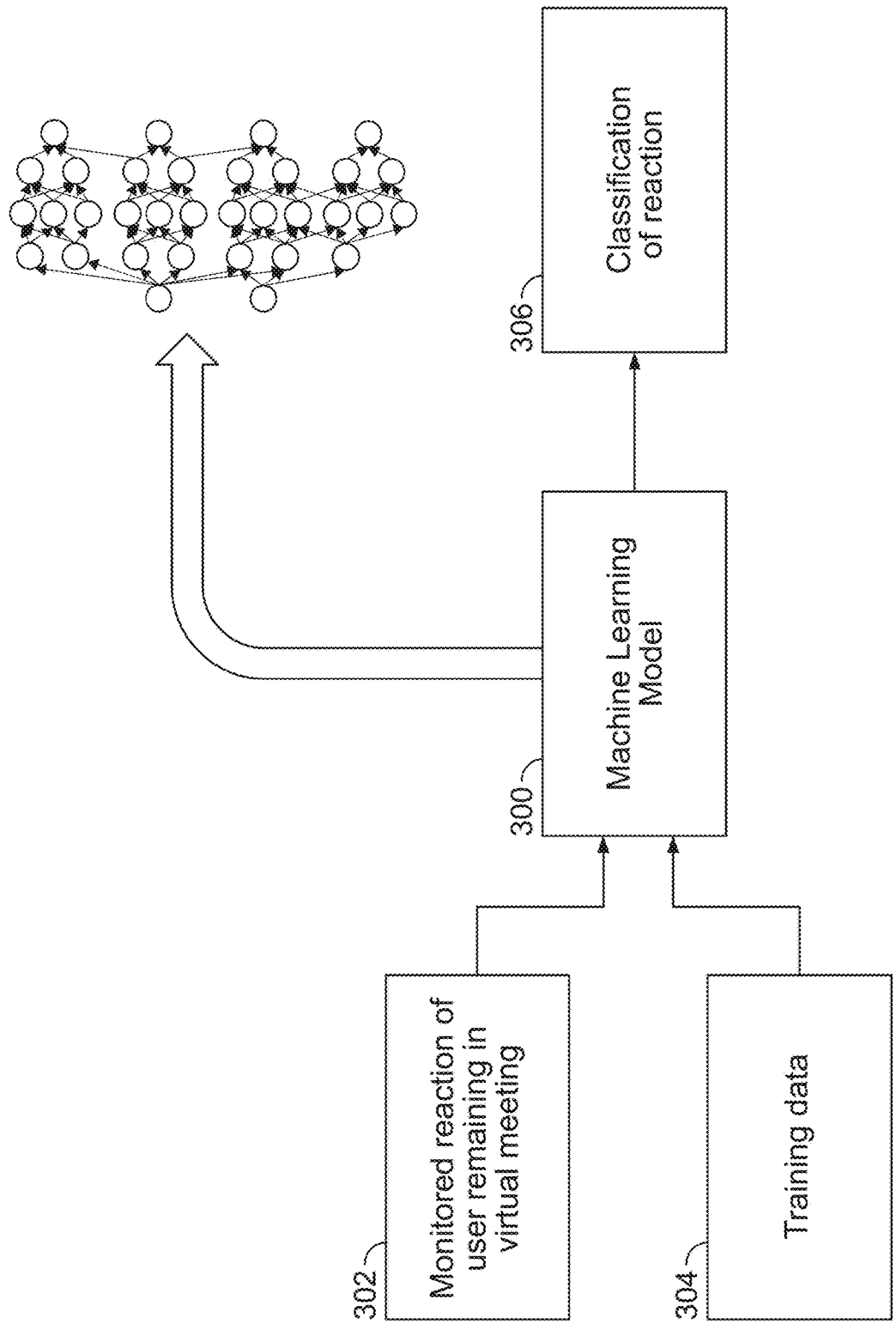
FIG. 3 depicts an illustrative example of a machine learning model used to determine whether to include portions of a virtual meeting in a summary, in accordance with some embodiments of this disclosure.

FIG. 3 depicts an illustrative example of a machine learning model 300 used to determine whether to include portions of a virtual meeting in a summary, in accordance with some embodiments of this disclosure. Machine learning model 300 may comprise one or more machine models which may correspond to, for example a deep neural network (DNN), a neural network, a recurrent neural network, a native Bayes model, logistic regression model, a linear regression model, a logistic classifier, decision trees, a deep reinforcement learning-based model, a convolutional neural network (CNN), or any other suitable machine learning model, or any combination thereof. Machine learning model 300, input data 302 and training data 304 may be stored at any suitable device(s) of the summary generator system. Machine learning model 300 may be implemented at any suitable device(s) of the summary generator system.

In some embodiments, an initial machine learning model for model 300 may be trained "offline," e.g., at a central server or third party. In some embodiments, the initial machine learning model may be abstracted by the summary generator system (for example, as a set of weights applied to a neural network) and transmitted (e.g., over network 909 of FIG. 9) to the user's computing devices, e.g., having a virtual meeting platform and/or summary generator application or system installed thereon or provided thereto. In some embodiments, each device improves the machine learning model 400 locally and sends the abstracted model and/or updates back to a central server. The central server may improve its own model (e.g., a global machine learning model) with iterative input from each device (e.g., using a federated learning approach) and may provide a new set of weights in the downlink to each user's computing device. In some embodiments, the user's computing devices may transmit to the central server parameters, e.g., weights for hidden layers of a neural network, associated with each locally implemented machine learning model.

Machine learning model 300 may be utilized to determine whether to include one or more portions of a virtual meeting during a BIP for one or more user(s) in a summary of a time period of the virtual meeting corresponding to the BIP. Specifically, machine learning model 300 may be trained, using training data 304, to receive as input a monitored reaction 302 of a user remaining in virtual meeting and output a characterization 306 of the input reaction 302. For example, machine learning model 300 may detect the emotions or gestures of users to classify frames of video of the user (or audio of the user, or any other suitable monitored reaction of the user). In the example of FIG. 2, machine learning model 300 may be used to characterize the reactions of the users during the BIP as "Face forward," "Look aside," or "Take notes." In some embodiments, separate machine learning models may be used to classify different types of inputs, e.g., a first machine learning model may be configured to receive input associated with features of a captured image, a second machine learning model may be configured to receive input associated with features of captured audio. In some embodiments, the same or a different machine learning model may analyze text or metadata associated with an input image or input audio or an input video.

In some embodiments, the summary generator system may assign importance scores based on pre-defined rules (e.g., +2 for a "Take notes" classification). In some embodiments, the summary generator system may assign importance scores using machine learning model 300, e.g., based on training data comprising scores assigned to similar historical reactions. In some embodiments, to determine an importance score of frames or fragments (or other portions of user reactions), the summary generator system may determine a likelihood that a particular user transitions to a particular expression or action, based on a user's body language or body posture. For example, machine learning model 300 may learn scores of the frame by sampling frame values or other portions of a user's reaction, and applying patterns learned from training data to the sampled frames or other portions of a user's reaction.

In some embodiments, importance scores may be assigned to various types of reactions of a particular portion of a virtual meeting during the BIP. For example, an importance score for a verbal or audio portion uttered by a user may be compared to an importance score for a user's body language or body posture, to determine with further confidence that a user's reaction corresponds to a particular classification such as if the audio classification matches the body language or body posture classification. In some embodiments, the summary generator system may utilize intersections of the various types of reaction for the particular portion of the virtual meeting, e.g., an emphasized word and "taking note" expressions can take place at the same time. In one embodiments, the summary generator system may group the classification of reactions or expressions based on the emotions they present, such as shouting expressions, crying expressions, and laughing expressions, e.g., using various image, audio, video and/or textual analysis machine learning techniques.

In some embodiments, machine learning model 300 may be updated or re-trained (e.g., offline and/or by the summary generator system) periodically to account for continuously changing video content or other content of virtual meetings. For example, the summary generator system may enable re-training of machine learning model 300, in some circumstances without sending audio or video training data to a central server. In some embodiments, the summary generator system may utilize federated learning techniques, where model 300 may be improved based on feedback received from each device, e.g., parameters such as, for example, weights being iteratively changed. In some embodiments, the central server may receive such feedback parameters from the user's computing devices locally implementing model 300, and the central server may update its own global model 300 using any suitable technique, e.g., averaging or summing the improvements or using any other suitable mathematical technique, or any combination thereof.

In some embodiments, machine learning model 300 may be trained to take into account that the reactions of the users can be different during different virtual meetings (e.g., online meetings, sports events, and group games or any other suitable type). In some embodiments, the characterization output by model 300 of inputs to model 300 may depend at least in part on the type of the virtual meeting (which may be determined by model 300 or another portion of the summary generator system, or based on analyzing the content or indicated in metadata or other data received by model 300). For example, models may be categorized based on virtual meeting events or types, e.g., two neural networks may be pre-trained for a watch party and a lecture, respectively. In such example, for a specific lecture, model parameters (e.g., previously learned via training by way of other lectures) can be sent to local devices of the specific lecture's students (attendees) to further tune the parameters for that specific lecture. A similar technique may be employed in association with a neural network for watch parties.

Machine learning model 300 may output a value, a vector, a range of values, any suitable numeric representation of classifications of objects, or any combination thereof indicative of one or more predicted classifications and/or associated confidence values. In some embodiments, input 302 and training data 304 may be preprocessed and represented as feature vectors, or any other suitable numerical representation of the input, of any suitable number of dimensions. For example, the feature vectors may correspond to scores for various characteristics of an image depicted in a frame. In the example of FIG. 2, feature vectors associated with each user remaining in the virtual meeting may be computed based on sampling frames of the corresponding user during the BIP at any suitable sampling rate. In some embodiments, a pre-trained machine learning model may be used to derive the feature vectors.

In some embodiments, machine learning model 300 may be trained by an iterative process of adjusting weights (and/or other parameters) for one or more layers of machine learning model 300. For example, the summary generator system may input training data 304 (e.g., image, video, audio and/or text of a user's reaction in a virtual meeting) into model 300, obtain an indication of a classification from model 300. Such classification may be compared to a ground truth value (e.g., an annotated indication of the correct classification of the input). The summary generator system may then adjust weights or other parameters of machine learning model 300 based on how closely the output matches the ground truth value. The training process may be repeated until results stop improving or until a certain performance level is achieved (e.g., until 95% accuracy is achieved, or any other suitable accuracy level or other metrics are achieved).

In some embodiments, model 300 may be trained to learn features and patterns with respect to particular features of image, video, audio or text inputs and corresponding characterizations. Such learned inferences and patterns may be applied to received data once model 300 is trained. In some embodiments, model 300 may trained at an initial training stage, e.g., offline. In some embodiments, model 300 may be trained or may continue to be trained on the fly or may be adjusted on the fly for continuous improvement, based on input data and inferences or patterns drawn from the input data, and/or based on comparisons after a particular number of cycles. In some embodiments, such input data may be offline data, e.g., as part of pre-training model 300. In some embodiments, model 300 may be content independent or content dependent, e.g., may continuously improve with respect to certain types of content.

In some embodiments, model 300 may be trained with any suitable amount of training data from any suitable number and/or types of sources. In some embodiments, machine learning model 300 may be trained by way of unsupervised learning, e.g., to recognize and learn patterns based on unlabeled data. For example, content-related reactions or expressions can be segregated from other types of reactions or expressions using various unsupervised video, audio, and/or text processing machine learning techniques.

In some embodiments, machine learning model 300 may be trained by supervised training with labeled training examples to help the model converge to an acceptable error range, e.g., to refine parameters, such as weights and/or bias values and/or other internal model logic, to minimize a loss function. In some embodiments, each layer may comprise one or more nodes that may be associated with learned parameters (e.g., weights and/or biases), and/or connections between nodes may represent parameters (e.g., weights and/or biases) learned during training (e.g., using backpropagation techniques, and/or any other suitable techniques). In some embodiments, the nature of the connections may enable or inhibit certain nodes of the network. In some embodiments, the summary generator system may be configured to receive (e.g., prior to training) user specification of (or automatic selection of) hyperparameters (e.g., a number of layers and/or nodes or neurons in each model). The summary generator system may automatically set or receive manual selection of a learning rate, e.g., indicating how quickly parameters should be adjusted. In some embodiments, the training image data may be suitably formatted and/or labeled by human annotators or otherwise labeled via a computer-implemented process. As an example, such labels may be categorized metadata attributes stored in conjunction with or appended to the training image data. The labels may comprise an indication of an importance (or unimportance) of a particular reaction, or an indication of a type of the reaction, or any other suitable information, or any combination thereof. Any suitable network training patch size and batch size may be employed for training model 300.

The summary generator system may perform any suitable pre-processing steps with respect to training data, and/or data to be input to the trained machine learning model (e.g., extracting suitable features from the training images, converting the features into a suitable numerical representation (e.g., one or more vector(s) and/or one or more matrices) normalization, resizing, minimization, brightening portions thereof, darkening the image or portions thereof, color shifting the image among color schemes, from color to grayscale, or other mapping, cropping the image, scaling the image, adjusting an aspect ratio of the image, adjusting contrast of an image, and/or performing any other suitable operating on or manipulating of the image data, or any combination thereof). In some embodiments, the image data processing system may pre-process image data to be input to the trained machine learning model, to cause a format of the input image data to match the formatting of the training data, or any other suitable processing may be performed, or any combination thereof.

Figure 4:
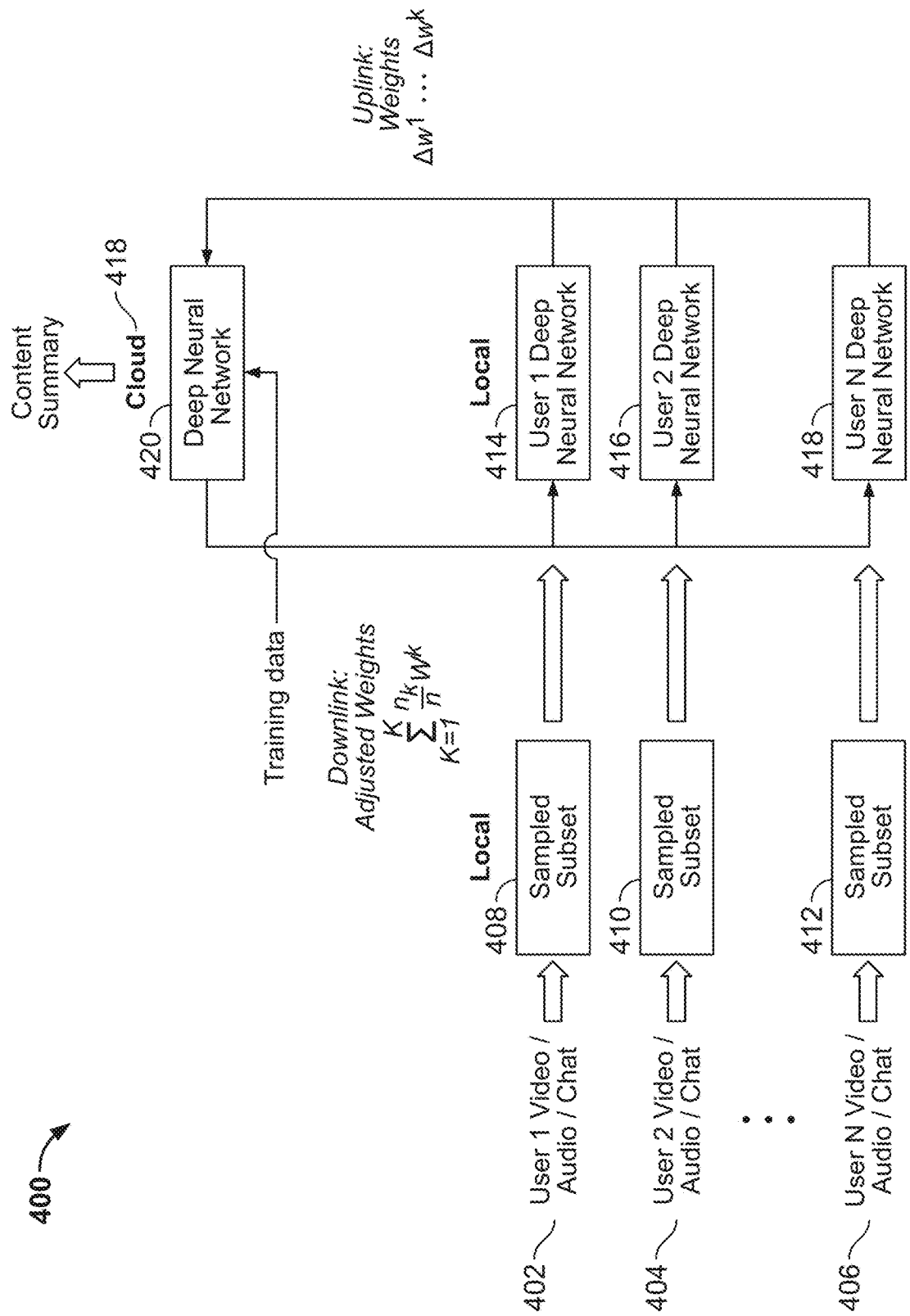
FIG. 4 depicts an illustrative example of a machine learning model used to determine whether to include portions of a virtual meeting in a summary, in accordance with some embodiments of this disclosure.

FIG. 4 depicts an illustrative example of a machine learning model used to determine whether to include portions of a virtual meeting in a summary, in accordance with some embodiments of this disclosure. FIG. 4 shows a federated learning system 400, which may be used to implement machine learning model 300. In some embodiments, an initial model may be suitably developed and transmitted to devices (e.g., computing devices of users participating in the virtual meetings of FIG. 1 or FIG. 2) of users 402, 404 . . . 406. For example, the local computing device may lack computational and/or storage resources to train the model from scratch. In some embodiments, to protect privacy of users, global model 420 implemented at a remote cloud server may not be trained centrally with audio, video, text and/or other data collected from virtual meetings.

In federated learning system 400, devices (e.g., computing devices of users participating in the virtual meetings of FIG. 1 or FIG. 2) of users 402, 404 . . . 406 may perform local training of machine learning models 414, 416 . . . 418, respectively, and deployment of such trained models. For example, machine learning models 414, 416 . . . 418 may correspond to machine learning model 300, and training and deploying the model locally may be performed without sharing raw data of users with central cloud 418 (e.g., remote server 904 of FIG. 9), which helps ensure security and privacy as well as reduce costs of computing resources at the central server. In federated learning system 400, devices of users 402, 404 . . . 406 may locally train their models based on their corresponding users' reactions and other participants in virtual meetings with such user, e.g., sampled subsets 408, 410 . . . 412. Computing devices of users 402, 404 . . . 406 may periodically provide to cloud 418 updated model parameters (e.g., weights or biases or other parameters) to cloud 418 (or an edge server), where global aggregation may be performed with respect to global model 420. As shown in FIG. 4, uplink weights may be provided as the model parameters to cloud 418 associated with model 420, and downlink adjusted weights may be distributed to computing devices of users 402, 404 . . . 406.

Figure 5:
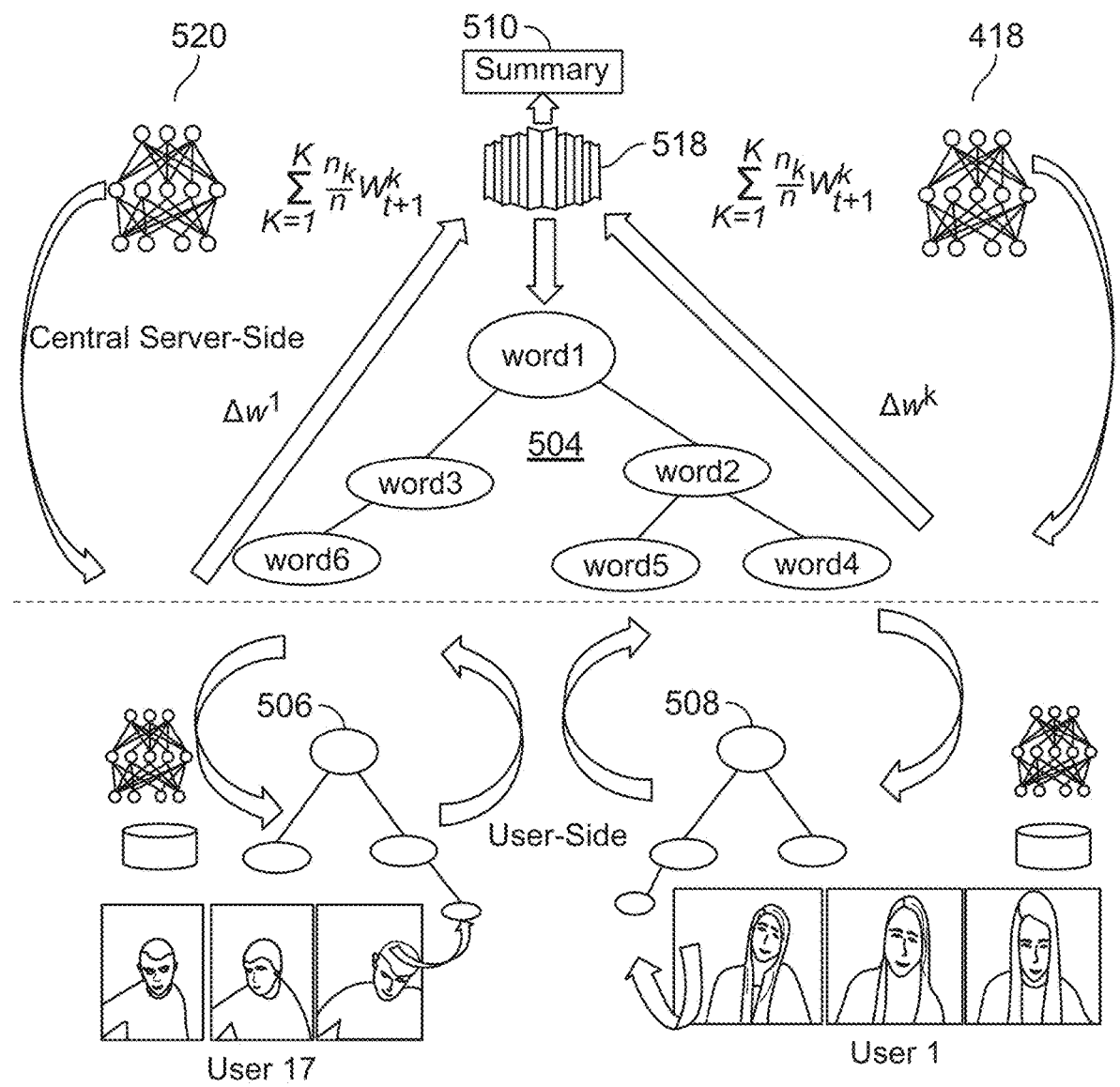
FIG. 5 depicts an illustrative block diagram of a system for providing a summary of a portion of a virtual meeting to a user, in accordance with some embodiments of this disclosure.

FIG. 5 depicts an illustrative block diagram of a system 500 for providing a summary of a portion of a virtual meeting to a user, in accordance with some embodiments of this disclosure. System 500 may correspond to or be included in the summary generator system described herein. The upper portion of FIG. 5 depicts a central server side, and the lower portion of FIG. 5 depicts a user local device side. As discussed in FIG. 4, the learning process during which machine learning model 300 of FIG. 3 may be trained and distributed to computing devices, e.g., associated with User 17 and User 1 in the example of FIG. 2. Such distribution may help to reduce recurring storage and computation costs at a central server after an initial machine learning model has been developed and preserve privacy (by locally processing raw data). In some embodiments, system 500 can be based on the federated learning approach, which may utilize a number of communication rounds where all participating devices send their local learning parameters, e.g., machine learning model weights, to be aggregated in a central cloud 518 (and/or edge server) to create a global shared model 520 (which may correspond to model 420 of FIG. 4) for content summarization.

One global shared model 520 is generated, new or updated model parameters may be distributed to every client device (e.g., of User 17 and User 1 and any other suitable client devices included in the summary generator system), which may be used to replace the current model parameters at the client side. In some embodiments, as shown in FIG. 5, global shared model 520 may be maintained with the weighted averages of the model weight parameters of the client devices. Such features may help enable data aggregation to be achieved, and individual clients can collaboratively learn an averaged shared model without compromising confidentiality.

In some embodiments, the parameters received by the server may comprise an indication of timestamped moments in the virtual meeting determined to be important during the BIP period, e.g., importance scoring of moments as a function of time, which may be used to generate the summary for the BIP period. In some embodiments, the parameters received by the server may further include parameters (e.g., updated weights or biases) for the machine learning model implemented at the central server, which may be received independently of the importance scores of the timestamped moments.

Figure 6:
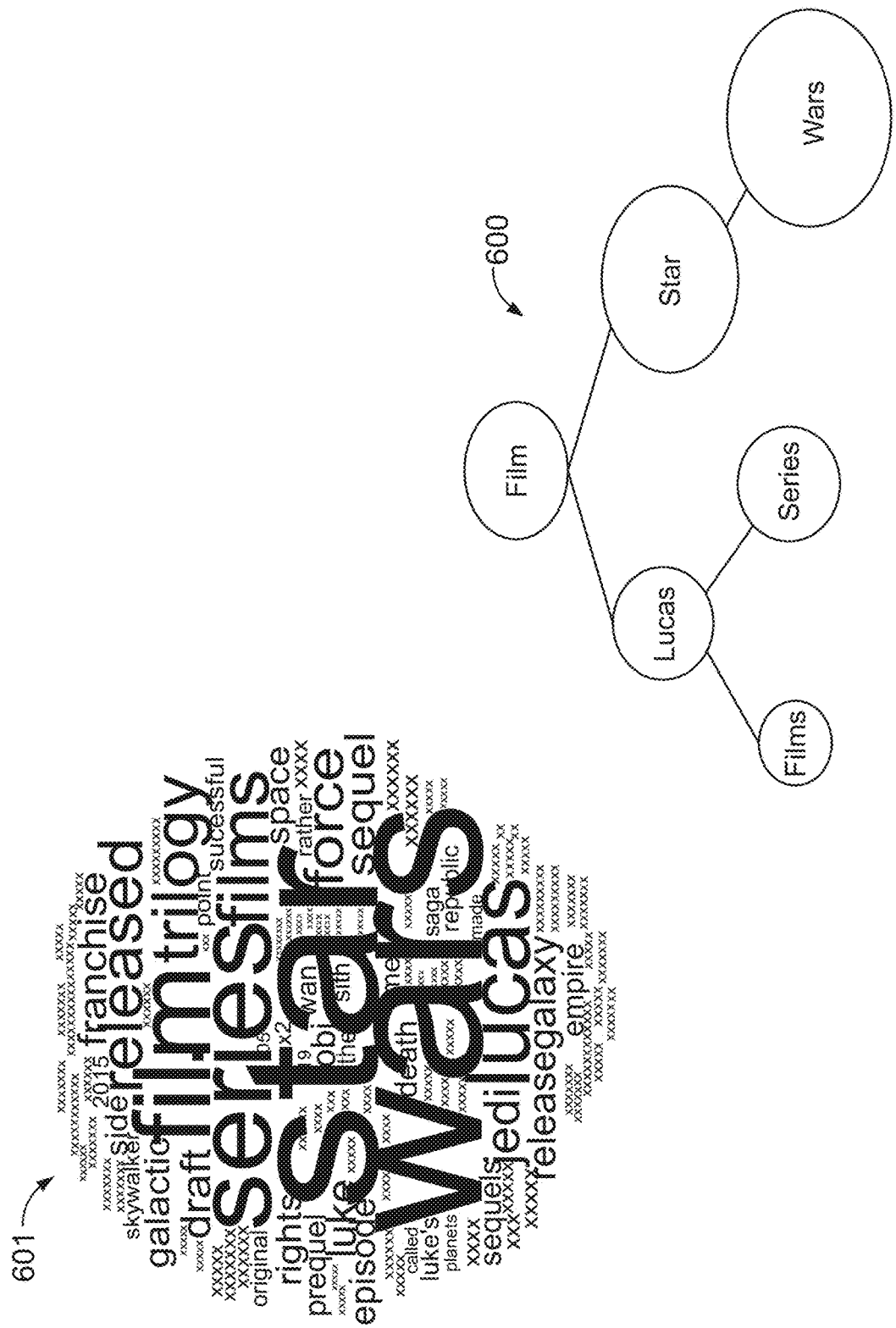
FIG. 6 depicts an illustrative data structure, in accordance with some embodiments of this disclosure.

FIG. 6 depicts an illustrative data structure, in accordance with some embodiments of this disclosure. In some embodiments, the summary generator system may employ data structure 600, which may be a word cloud, to analyze virtual meeting data. For example, a word cloud may be used to distinguish on-topic and off-topic voice data or utterances or verbalizations during a virtual meeting. The summary generator system may generate the word cloud to identify the most frequently used words or terms or phrases during one or more virtual meetings, as such words or terms or phrases may be likely to represent important portions of the virtual meeting. For example, if the participants of the virtual meetings are talking about movies, such as "Star Wars," an illustrative word distribution 601 of such virtual meeting may be determined, with a font size being an indicator of frequency that a word, term or phrase is used. 600 may correspond to a balanced search tree of word clouds formed in a central server (e.g., 518 of FIG. 5). In some embodiments, data structure 600 may correspond to a word cloud, a knowledge graph, or any other suitable data structure, or any combination thereof.

When the participants of a virtual meeting are not muted, e.g., when they explain the content of the meeting or give opinions, ask questions, or otherwise speak (or audio input associated with the virtual meeting is otherwise received), their verbal contents may be transmitted to the central server. While the meeting progresses, this verbal content may accumulate, where certain phrases or terms or words may be used more frequently than others, as reflected in a word cloud. The word cloud may be a balanced search tree of word clouds in the central server (e.g., word cloud 504 of FIG. 5), and/or at client side devices (e.g., word cloud 506 and 508 of FIG. 5), or a balanced B-Tree that can hold a number of word counts, sentences of the words, or any other suitable metrics, or use max heap as the underlying data structure.

In some embodiments, a full version of the data structure may be maintained at the central server, and a data structure corresponding to certain times of the virtual meeting, or certain portions of the data structure, up to a certain tree depth (e.g., 3 or any other suitable depth), or any other suitable portion of the data structure, may be generated at the user side. In some embodiments, while the virtual meeting is ongoing, while certain users may be muted with respect to the other user's participating in the virtual meeting, their voices may be captured locally and used to update their respective locally stored trees. For example, the summary generator system may cause the client devices of such users to locally determine if their reactions (e.g., taking notes) are related to the content of the ongoing virtual meeting, e.g., by searching their words or phrases or terms in their local trees. For example, if a muted user is determined to be mentioning or discussing the movie Star Wars in the background, the summary generator system can search the words that appear in his or her muted talk in the local tree and if a match is determined, the summary generator system can determine that the user is on the topic of the virtual meeting.

In some embodiments, after determining that the user's reaction is related to the topic of the virtual meeting, matched word counts may be sent to the central server which may update its central tree accordingly. This may allow all related verbal content from the users to the central server by sharing the parameters, e.g., the number of words that appeared in the muted talks, rather than the actual words. As another example, the summary generator system may process consecutive video fragments or frames of users, whose cameras can be on or off (e.g., with respect to other user's participating in the virtual meeting). For example, the summary generator system may determine that, if the content of the video conference attracts the users' attention, the user is likely to look forward or down, e.g., at the speaker in the virtual meeting or taking notes. On the other hand, if the users are looking at either their right or left, this may be an indication that the content of the virtual meeting is not attracting their attention and may not correspond to an important portion of the virtual meeting.

Figure 7:
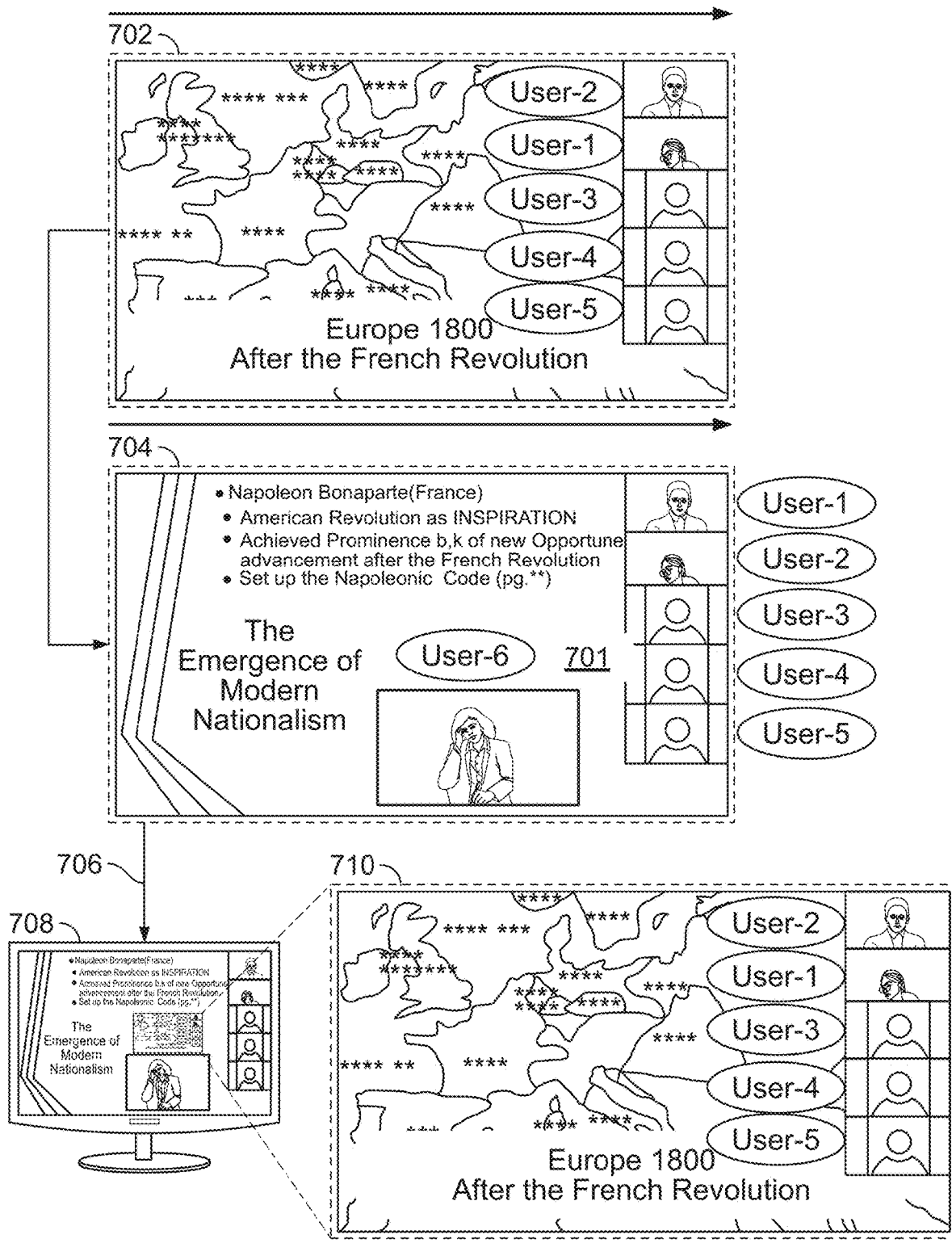
FIG. 7 is a flowchart of a detailed illustrative process for providing a summary of a portion of a virtual meeting to a user, in accordance with some embodiments of this disclosure.

FIG. 7 is a flowchart of a detailed illustrative process 700 for providing a summary of a portion of a virtual meeting to a user, in accordance with some embodiments of this disclosure. As shown at 702, the summary generator system may determine that a virtual meeting (e.g., a History lecture or class in which User 2 is the lecturer or professor or teacher for the class). In some embodiments, FIG. 7 may correspond to the example of FIG. 2. In some embodiments, User 2, the main speaker, may be sharing his or her screen with the other participants, which may include any stable content, in this case depicting a map of Europe and including the text "Europe 1800's" "After the French Revolution" and/or other notes. The example shown at 702 may reflect the scenario where a particular user (e.g., User 6 shown at 701) has temporarily exited the virtual meeting, and thus an icon corresponding to User 6 is not shown at 702. In some embodiments, when User 6 temporarily leaves, an icon may nonetheless be provided indicating that User 6 temporarily exited the virtual meeting and may be attempting to re-join the virtual meeting. User 6 may have left the virtual meeting for, e.g., 5 minutes or any other suitable time period, which may correspond to the BIP event, while Users 1 and 3-5 continue to participate in the virtual meeting being led by User 2.

As shown at 702, Users 1 and 2 are in a video-on mode, e.g., sharing their respective video feeds, captured by cameras of their respective devices participating in the virtual meeting, with the central server (e.g., server 518 of FIG. 5), and thus the central server may access and render such video feed to the other users participating in the virtual meeting. On the other hand, Users 3-5 are in a video-off mode, e.g., are participating in the virtual meeting without sharing their video feeds with the central server which may be facilitating the virtual meeting, and these video fees are not accessible to the central server and are not rendered to other users participating in the virtual meeting. At 702, the summary generator system may cause the computing devices of Users 1-5 to locally monitor reactions of the corresponding User 1-5 and/or any other suitable users participating in the virtual meeting. Based on such monitoring, the summary generator system may identify important or salient frames during the BIP, e.g., during the 5 minutes User 6 is absent from the virtual meeting. In some embodiments, the importance may be determined based at least in part on the classifications shown in FIG. 2.

In some embodiments, the central server may receive, from the various devices participating in the virtual meeting, one or more parameters (e.g., indicating types of reactions or a number of reactions) and corresponding time stamps the reactions were detected. In some embodiments, the central server may aggregate these parameters and send them back to the user side, and such process may be performed continuously or periodically during the BIP. The central server may collect information on how many reactions, and/or what types of reactions, are detected for a specific frame or other portion of the virtual meeting during the BIP. The summary generator system may select portions of the virtual meeting during the BIP (for inclusion in the summary) having the highest number of reactions, or the highest number of a certain type of reactions, or a highest importance score, or based on any other suitable criteria. In some embodiments, the parameters received by the server may further include parameters (e.g., updated weights or biases) for the machine learning model implemented at the central server, which may be received independently of the importance scores of the timestamped moments, which may be received independently of the importance scores of the timestamped moments. In some embodiments, such updated weights or biases may not pertain to a specific virtual meeting, unlike the importance scores for a particular virtual meeting.

As shown at 704, the summary generator system may determine that User 6 shown at 701 has returned and rejoined the virtual meeting. In some embodiments, the other users participating in the virtual meeting may be presented with an icon indicating that User 6 has rejoined the virtual meeting. At 706, the summary generator system may generate a summary of the BIP based on the monitored information of 702. In some embodiments, consecutive frames or portions during the BIP having the most reactions or highest importance score may be included in the summary. In some embodiments, such portions may be identified based on a word cloud, such as shown in FIG. 6, associated with the virtual meeting, and/or the user's visual expressions, to identify intersections therebetween and identify with further confidence important portions of the virtual meeting during the BIP. For example, an emphasized or frequently occurring word, and a "Taking notes" reaction can mutually indicate the importance of a particular portion of the virtual meeting, and taken together further emphasize the importance of such portion. In some embodiments, machine learning techniques may be employed that utilize both verbal expressions and parameters that are locally learnt from users' visual expressions.

As shown at 706, the summary generator system (e.g., the central server and/or the computing device of User 6) may render summary 710 of the portion of the virtual meeting during the BIP to User 6. In some embodiments, summary 710 may be generated based on the monitoring and analysis in 702 and 704. In some embodiments, summary 710 may be a pop-up summary, provided to User 6 at computing device 708 during the ongoing virtual meeting (e.g., at a time when participants of the virtual meeting reactions indicate a low importance score or the least amount of reactions to a current portion of the virtual meeting). In some embodiments, summary 710 may be presented after the conclusion of the virtual meeting. Summary 710 may comprise still images, audio, video, text or any other suitable content or any combination thereof, and may be shorter in length the portion of the virtual meeting during the BIP of User 6, e.g., summary 710 may be 1-minute-long from the 5 minute portion during the BIP.

By causing the visual and verbal and/or other reactions and expressions to be monitored and analyzed locally, the central server's computational burden may be relieved, and such a decentralized approach may employ federated learning techniques. Such aspects may further minimize central server computation and storage costs and locally preserve privacy-sensitive data, e.g., analyzed reaction data of users participating in a virtual meeting.

In some embodiments, during a virtual meeting, the summary generator system may monitor for and analyze audio signals uttered by one or more users (or other audio signals) by digitizing audio signals received in analog form by one or more microphones of one or more devices joined to the virtual meeting, and may perform parsing of the audio input. For example, the summary generator system may be configured to perform automatic speech recognition (ASR) to convert audio signals to a textual format. The summary generator system may be configured to transcribe the audio input into a string of text using any suitable ASR technique. For example, one or more machine learning models may be employed, e.g., recurrent neural networks, bidirectional recurrent neural networks, LSTM-RNN models, encoder-decoder models, transformers, conditional random fields (CRF) models, and/or any other suitable model(s). Such one or more models may be trained to take as input labeled audio files or utterances, and output one or more candidate transcriptions of the audio file or utterance. In some embodiments, the summary generator system may pre-process the received audio input for input into the neural network, e.g., to filter out background noise and/or normalize the signal, or such processing may be performed by the machine learning model. In some embodiments, in generating the candidate transcriptions, the voice processing application may analyze the received audio signal to identify phonemes (i.e., distinguishing units of sound within a term) within the signal, and utilize statistical probability techniques to determine most likely next phonemes in the received query. For example, the model may be trained on a large vocabulary of words, to enable the model to recognize common language patterns and aid in the ability to identify candidate transcriptions of voice input. Additionally, or alternatively, transcription of the audio signal may be achieved by external transcription services (e.g., Amazon Transcribe by Amazon, Inc. of Seattle, WA and Google Speech-to-Text by Google, Inc. of Mountain View, CA). The transcription of audio is discussed in more detail in U.S. patent application Ser. No. 16/397,004, filed Apr. 29, 2019, which is hereby incorporated by reference herein in its entirety.

The summary generator system may further employ natural language processing (NLP) including natural language understanding (NLU), e.g., tokenization of the string of the audio input, stemming and lemmatization techniques, parts of speech tagging, domain classification, intent classification and named entity recognition with respect to the received audio signals. In some embodiments, rule-based NLP techniques or algorithms may be employed to parse text included in the received audio signals. For example, NLP circuitry or other linguistic analysis circuitry may apply linguistic, sentiment, and grammar rules to tokenize words from a text string, and may perform chunking of the query, which may employ different techniques, e.g., N-gram extraction, skip gram, and/or edge gram; identify parts of speech (i.e., noun, verb, pronoun, preposition, adverb, adjective, conjunction, participle, article); perform named entity recognition; and identify phrases, sentences, proper nouns, or other linguistic features of the text string. In some embodiments, statistical natural language processing techniques may be employed. In some embodiments, a knowledge graph may be employed to discern relationships among entities. In some embodiments, one or more machine learning models may be utilized to categorize one or more intents of the audio input. In some embodiments, the NLP system may employ a slot-based filling pipeline technique and templates to discern an intent of captured audio signals.

In some embodiments, the summary generator system may capture and analyze in real time a plurality of images of the digital representations of users participating in the virtual meeting. For example, the summary generator system may include or be in communication with an image sensor to capture one or more images, and may utilize any suitable facial recognition algorithm and/or image processing techniques to identify or extract various facial features, body language or gestures of the digital representations or avatars of the captured images. The summary generator system may compare the extracted features to those stored at a database, and/or utilize machine learning techniques, to classify the facial features or gestures shown in the image. In some embodiments, the summary generator system computes a similarity score for a comparison between an extracted feature and a feature stored at the database, and may determine that there is a match if a computed similarity score exceeds a certain threshold. In some embodiments, the summary generator system may generate an image signature or facial signature of a digital representation of a user. In some embodiments, the signature may comprise a feature vector including numerical values representing the various detected features which may be compared to feature vectors to known emotional states or gestures (e.g., a feature or gesture indicative of a user being happy, interested, neutral, sad, disinterested, or surprised, or a gesture such as a smile, a frown, an eye roll, a thumbs up, a thumbs down, or any other suitable emotional state or gesture, or any combination thereof).

In some embodiments, the summary generator system may perform processing to identify and classify users and/or other objects or text included in a captured image, and may determine whether such actions of, or the presence of, such users or objects or text reflect on a particular user. For example, the summary generator system may employ image segmentation (e.g., semantic segmentation and/or instance segmentation) and classification to identify and localize different types or classes of entities in frames of a captured image. Such segmentation techniques may include determining which pixels or voxels belong to a depiction of a user, and/or which pixels or voxels should be mapped to a particular facial feature (e.g., head, nose, car, eyes, shoulder, mouth, etc.) or any other suitable feature of User A, or which pixels or voxels should be mapped to a particular object. For example, the summary generator system may employ machine learning, computer vision, object recognition, pattern recognition, facial recognition, image processing, image segmentation, edge detection, or any other suitable technique or any combination thereof. Additionally, or alternatively, the summary generator system may employ color pattern recognition, partial linear filtering, regression algorithms, and/or neural network pattern recognition, or any other suitable technique or any combination thereof.

In some embodiments, the summary generator system may determine whether to include one or more portions of the virtual meeting during the BIP in a summary based at least in part on content of the portion(s) (e.g., analyzing key words spoken by speakers such as User 2 during the BIP or analyzing images presented during the BIP). For example, if the user's profile indicates a preference for certain topics, and the analyzed key words or analyzed images or certain portion(s) during the BIP are determined to match those topics, the summary generator system may determine that such portion(s) should be included in the summary.

Figure 8:
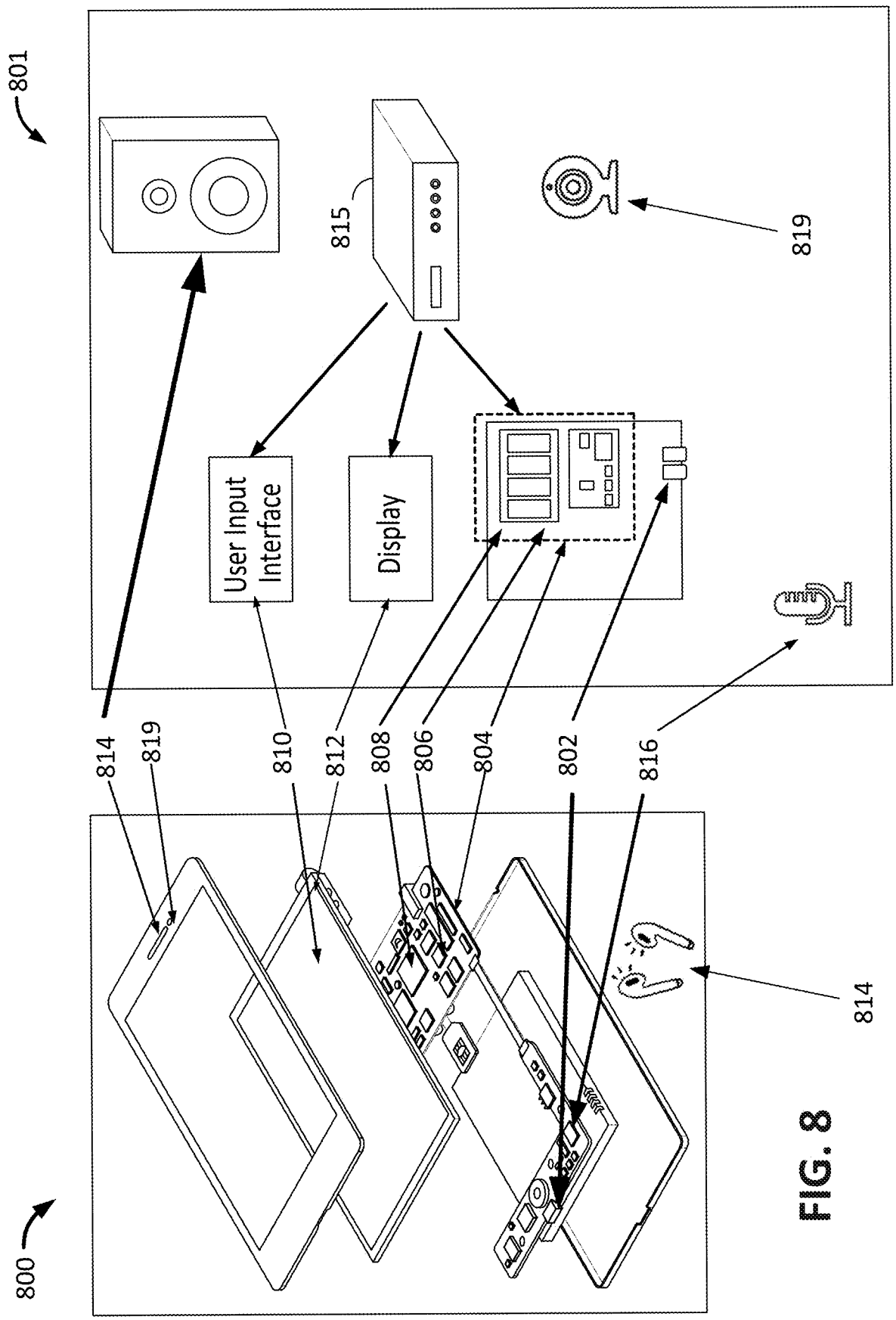
FIGS. 8-9 depict illustrative devices, systems, servers, and related hardware providing a summary of a portion of a virtual meeting to a user, in accordance with some embodiments of this disclosure.

FIGS. 8-9 depict illustrative devices, systems, servers, and related hardware for providing a summary of a portion of a virtual meeting to a user, in accordance with some embodiments of this disclosure. FIG. 8 shows generalized embodiments of illustrative computing devices 800 and 801, which may correspond to, e.g., computing device 108 of FIG. 1 and computing device 708 of FIG. 7, or any suitable device configured to join a virtual meeting. For example, computing device 800 may be a smartphone device, a tablet, a near-eye display device, a XR (e.g., virtual reality or augmented reality or mixed reality) computing device, or any other suitable device capable of participating in an interactive video session or other media virtual meeting (e.g., in real time or otherwise) over a communication network. In another example, computing device 801 may be a user television equipment system or device. Computing device 801 may include set-top box 815. Set-top box 815 may be communicatively connected to microphone 816, audio output equipment (e.g., speaker or headphones 814), and display 812. In some embodiments, microphone 816 may receive audio corresponding to a voice of a video conference participant and/or ambient audio data during a video conference. In some embodiments, display 812 may be a television display or a computer display. In some embodiments, set-top box 815 may be communicatively connected to user input interface 810. In some embodiments, user input interface 810 may be a remote control device. Set-top box 815 may include one or more circuit boards. In some embodiments, the circuit boards may include control circuitry, processing circuitry, and storage (e.g., RAM, ROM, hard disk, removable disk, etc.). In some embodiments, the circuit boards may include an input/output path. More specific implementations of computing devices are discussed below in connection with FIG. 9. In some embodiments, computing device 800 may comprise any suitable number of sensors (e.g., gyroscope or gyrometer, or accelerometer, etc.), and/or a GPS module (e.g., in communication with one or more servers and/or cell towers and/or satellites) to ascertain a location of computing device 800. In some embodiments, computing device 800 comprises a rechargeable battery that is configured to provide power to the components of the computing device.

Each one of computing device 800 and computing device 801 may receive content and data via input/output (I/O) path 802. I/O path 802 may provide content (e.g., broadcast programming, on-demand programming, Internet content, content available over a local area network (LAN) or wide area network (WAN), and/or other content) and data to control circuitry 804, which may comprise processing circuitry 806 and storage 808. Control circuitry 804 may be used to send and receive commands, requests, and other suitable data using I/O path 802, which may comprise I/O circuitry. I/O path 802 may connect control circuitry 804 (and specifically processing circuitry 806) to one or more communications paths (described below). I/O functions may be provided by one or more of these communications paths, but are shown as a single path in FIG. 8 to avoid overcomplicating the drawing. While set-top box 815 is shown in FIG. 8 for illustration, any suitable computing device having processing circuitry, control circuitry, and storage may be used in accordance with the present disclosure. For example, set-top box 815 may be replaced by, or complemented by, a personal computer (e.g., a notebook, a laptop, a desktop), a smartphone (e.g., computing device 800), an XR device, a tablet, a network-based server hosting a user-accessible client device, a non-user-owned device, any other suitable device, or any combination thereof.

Control circuitry 804 may be based on any suitable control circuitry such as processing circuitry 806. As referred to herein, control circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 804 executes instructions for the summary generator system stored in memory (e.g., storage 808). Specifically, control circuitry 804 may be instructed by the summary generator system to perform the functions discussed above and below. In some implementations, processing or actions performed by control circuitry 804 may be based on instructions received from the video communication application.

In client/server-based embodiments, control circuitry 804 may include communications circuitry suitable for communicating with a server or other networks or servers. The summary generator system may be a stand-alone application implemented on a computing device or a server. The summary generator system may be implemented as software or a set of executable instructions. The instructions for performing any of the embodiments discussed herein of the summary generator system may be encoded on non-transitory computer-readable media (e.g., a hard drive, random-access memory on a DRAM integrated circuit, read-only memory on a BLU-RAY disk, etc.). For example, in FIG. 8, the instructions may be stored in storage 808, and executed by control circuitry 804 of a computing device 800.

In some embodiments, the summary generator system may be a client/server application where only the client application resides on computing device 800 (e.g., computing device 108 of FIG. 1), and a server application resides on an external server (e.g., server 904 of FIG. 9 which may correspond to 418 of FIG. 4 and 518 of FIG. 5). For example, the summary generator system may be implemented partially as a client application on control circuitry 804 of computing device 800 and partially on server 904 as a server application running on control circuitry 911. Server 904 may be a part of a local area network with one or more of computing devices 800, 801 or may be part of a cloud computing environment accessed via the internet. In a cloud computing environment, various types of computing services for performing searches on the internet or informational databases, providing video communication capabilities, providing storage (e.g., for a database) or parsing data are provided by a collection of network-accessible computing and storage resources (e.g., server 904 and/or an edge computing device), referred to as "the cloud." Computing device 800 may be a cloud client that relies on the cloud computing capabilities from server 904 to detect a BIP event for a user of a computing device participating in a virtual meeting, monitor other user's reactions participating in the virtual meeting during the BIP, and determine whether to generate a summary of the portion of the virtual meeting during the BIP based on the monitored reactions. When executed by control circuitry of server 904, the summary generator system may instruct control circuitry 811 to perform such tasks. The client application may instruct control circuitry 804 to determine such tasks. In some embodiments, the video conference may correspond to one or more of online meetings, virtual meeting rooms, video calls, Internet Protocol (IP) video calls, etc.

Control circuitry 804 may include communications circuitry suitable for communicating with a video communication or video conferencing server, XR content servers, social networking servers, video gaming servers, edge computing systems and devices, a table or database server, or other networks or servers. The instructions for carrying out the above mentioned functionality may be stored on a server (which is described in more detail in connection with FIG. 9). Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communication networks or paths (which is described in more detail in connection with FIG. 9). In addition, communications circuitry may include circuitry that enables peer-to-peer communication of computing devices, or communication of computing devices in locations remote from each other (described in more detail below).

Memory may be an electronic storage device provided as storage 808 that is part of control circuitry 804. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 808 may be used to store various types of content described herein as well as summary generator system data described above. Nonvolatile memory may also be used (e.g., to launch a boot-up routine and other instructions). Cloud-based storage, described in relation to FIG. 8, may be used to supplement storage 808 or instead of storage 808.

Control circuitry 804 may include video generating circuitry and tuning circuitry, such as one or more analog tuners, one or more MPEG-2 decoders or MPEG-2 decoders or decoders or HEVC decoders or any other suitable digital decoding circuitry, high-definition tuners, or any other suitable tuning or video circuits or combinations of such circuits. Encoding circuitry (e.g., for converting over-the-air, analog, or digital signals to MPEG or HEVC or any other suitable signals for storage) may also be provided. Control circuitry 804 may also include scaler circuitry for upconverting and downconverting content into the preferred output format of computing device 800. Control circuitry 804 may also include digital-to-analog converter circuitry and analog-to-digital converter circuitry for converting between digital and analog signals. The tuning and encoding circuitry may be used by computing device 800, 801 to receive and to display, to play, or to record content. The tuning and encoding circuitry may also be used to receive video communication session data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 808 is provided as a separate device from computing device 800, the tuning and encoding circuitry (including multiple tuners) may be associated with storage 808.

Control circuitry 804 may receive instruction from a user by way of user input interface 810. User input interface 810 may be any suitable user interface, such as a remote control, mouse, trackball, keypad, keyboard, touch screen, touchpad, stylus input, joystick, voice recognition interface, or other user input interfaces. Display 812 may be provided as a stand-alone device or integrated with other elements of each one of computing device 800 and computing device 801. For example, display 812 may be a touchscreen or touch-sensitive display. In such circumstances, user input interface 810 may be integrated with or combined with display 812. In some embodiments, user input interface 810 includes a remote-control device having one or more microphones, buttons, keypads, any other components configured to receive user input or combinations thereof. For example, user input interface 810 may include a handheld remote-control device having an alphanumeric keypad and option buttons. In a further example, user input interface 810 may include a handheld remote-control device having a microphone and control circuitry configured to receive and identify voice commands and transmit information to set-top box 815.

Audio output equipment 814 may be integrated with or combined with display 812. Display 812 may be one or more of a monitor, a television, a liquid crystal display (LCD) for a mobile device, amorphous silicon display, low-temperature polysilicon display, electronic ink display, electrophoretic display, active matrix display, electro-wetting display, electro-fluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. A video card or graphics card may generate the output to the display 812. Audio output equipment 814 may be provided as integrated with other elements of each one of computing device 800 and computing device 801 or may be stand-alone units. An audio component of videos and other content displayed on display 812 may be played through speakers (or headphones) of audio output equipment 814. In some embodiments, audio may be distributed to a receiver (not shown), which processes and outputs the audio via speakers of audio output equipment 814. In some embodiments, for example, control circuitry 804 is configured to provide audio cues to a user, or other audio feedback to a user, using speakers of audio output equipment 814. There may be a separate microphone 816 or audio output equipment 814 may include a microphone configured to receive audio input such as voice commands or speech. For example, a user may speak letters or words that are received by the microphone and converted to text by control circuitry 804. In a further example, a user may voice commands that are received by a microphone and recognized by control circuitry 804. Camera 819 may be any suitable video camera integrated with the equipment or externally connected. Camera 819 may be a digital camera comprising a charge-coupled device (CCD) and/or a complementary metal-oxide semiconductor (CMOS) image sensor. Camera 819 may be an analog camera that converts to digital images via a video card.

The summary generator system may be implemented using any suitable architecture. For example, it may be a stand-alone application wholly-implemented on each one of computing device 800 and computing device 801. In such an approach, instructions of the application may be stored locally (e.g., in storage 808), and data for use by the application is downloaded on a periodic basis (e.g., from an out-of-band feed, from an Internet resource, or using another suitable approach). Control circuitry 804 may retrieve instructions of the application from storage 808 and process the instructions to provide video conferencing functionality and generate any of the displays discussed herein. Based on the processed instructions, control circuitry 804 may determine what action to perform when input is received from user input interface 810. For example, movement of a cursor on a display up/down may be indicated by the processed instructions when user input interface 810 indicates that an up/down button was selected. An application and/or any instructions for performing any of the embodiments discussed herein may be encoded on computer-readable media. Computer-readable media includes any media capable of storing data. The computer-readable media may be non-transitory including, but not limited to, volatile and non-volatile computer memory or storage devices such as a hard disk, floppy disk, USB drive, DVD, CD, media card, register memory, processor cache, Random Access Memory (RAM), etc.

Control circuitry 804 may allow a user to provide user profile information or may automatically compile user profile information. For example, control circuitry 804 may access and monitor network data, video data, audio data, processing data, participation data from a conference participant profile. Control circuitry 804 may obtain all or part of other user profiles that are related to a particular user (e.g., via social media networks), and/or obtain information about the user from other sources that control circuitry 804 may access. As a result, a user can be provided with a unified experience across the user's different devices.

In some embodiments, the summary generator system is a client/server-based application. Data for use by a thick or thin client implemented on each one of computing device 800 and computing device 801 may be retrieved on-demand by issuing requests to a server remote to each one of computing device 800 and computing device 801. For example, the remote server may store the instructions for the application in a storage device. The remote server may process the stored instructions using circuitry (e.g., control circuitry 804) and generate the displays discussed above and below. The client device may receive the displays generated by the remote server and may display the content of the displays locally on computing device 800. This way, the processing of the instructions is performed remotely by the server while the resulting displays (e.g., that may include text, a keyboard, or other visuals) are provided locally on computing device 800. Computing device 800 may receive inputs from the user via input interface 810 and transmit those inputs to the remote server for processing and generating the corresponding displays. For example, computing device 800 may transmit a communication to the remote server indicating that an up/down button was selected via input interface 810. The remote server may process instructions in accordance with that input and generate a display of the application corresponding to the input (e.g., a display that moves a cursor up/down). The generated display may then be transmitted to computing device 800 for presentation to the user.

In some embodiments, the summary generator system may be downloaded and interpreted or otherwise run by an interpreter or virtual machine (run by control circuitry 804). In some embodiments, the summary generator system may be encoded in the ETV Binary Interchange Format (EBIF), received by control circuitry 804 as part of a suitable feed, and interpreted by a user agent running on control circuitry 804. For example, the summary generator system may be an EBIF application. In some embodiments, the summary generator system may be defined by a series of JAVA-based files that are received and run by a local virtual machine or other suitable middleware executed by control circuitry 804. In some of such embodiments (e.g., those employing MPEG-2, MPEG-4, HEVC or any other suitable digital media encoding schemes), summary generator system may be, for example, encoded and transmitted in an MPEG-2 object carousel with the MPEG audio and video packets of a program.

As shown in FIG. 9, devices 906, 907, 908, and 910 may be coupled to communication network 909. In some embodiments, each of computing devices 906, 907, 908, and 910 may correspond to one of computing devices 800 or 801 of FIG. 8, device 108 of FIG. 1, computing device 708 of FIG. 7, or any other suitable device capable of joining a virtual meeting, or any combination thereof. Communication network 909 may be one or more networks including the Internet, a mobile phone network, mobile, voice or data network (e.g., a 5G, 4G, or LTE network), cable network, public switched telephone network, or other types of communication network or combinations of communication networks. Paths (e.g., depicted as arrows connecting the respective devices to the communication network 909) may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. Communications with the client devices may be provided by one or more of these communications paths but are shown as a single path in FIG. 9 to avoid overcomplicating the drawing.

Although communications paths are not drawn between computing devices, these devices may communicate directly with each other via communications paths as well as other short-range, point-to-point communications paths, such as USB cables, IEEE 1394 cables, wireless paths (e.g., Bluetooth, infrared, IEEE 702-11x, etc.), or other short-range communication via wired or wireless paths. The computing devices may also communicate with each other directly through an indirect path via communication network 909.

System 900 may comprise media content source 902, one or more servers 904, and/or one or more edge computing devices. In some embodiments, the summary generator system may be executed at one or more of control circuitry 911 of server 904 (and/or control circuitry of computing devices 906, 907, 908, 910 and/or control circuitry of one or more edge computing devices). In some embodiments, media content source 902 and/or server 904 may be configured to host or otherwise facilitate communication sessions between computing devices 906, 907, 908, 910 and/or any other suitable devices, and/or host or otherwise be in communication (e.g., over network 909) with one or more social network services.

In some embodiments, server 904 may include control circuitry 911 and storage 914 (e.g., RAM, ROM, Hard Disk, Removable Disk, etc.). Storage 914 may store one or more databases. Server 904 may also include an input/output path 912. I/O path 912 may provide video conferencing data, device information, or other data, over a local area network (LAN) or wide area network (WAN), and/or other content and data to control circuitry 911, which may include processing circuitry, and storage 914. Control circuitry 911 may be used to send and receive commands, requests, and other suitable data using I/O path 912, which may comprise I/O circuitry. I/O path 912 may connect control circuitry 911 (and specifically control circuitry) to one or more communications paths.

Control circuitry 911 may be based on any suitable control circuitry such as one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry 911 may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 911 executes instructions for an emulation system application stored in memory (e.g., the storage 914). Memory may be an electronic storage device provided as storage 914 that is part of control circuitry 911.

Figure 10:
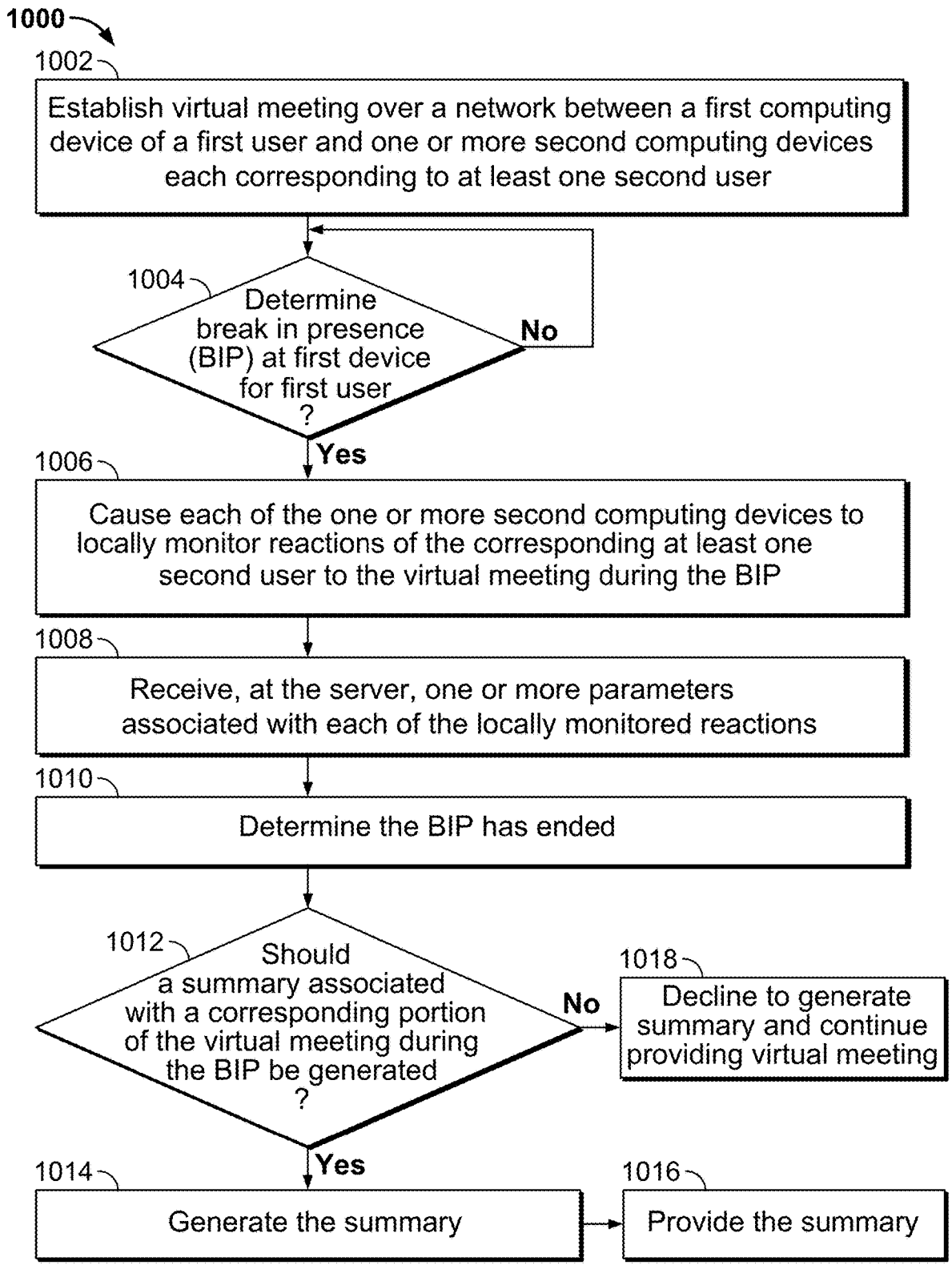
FIG. 10 is a flowchart of a detailed illustrative process for providing a summary of a portion of a virtual meeting to a user, in accordance with some embodiments of this disclosure.

FIG. 10 is a flowchart of a detailed illustrative process 1000 for providing a summary of a portion of a virtual meeting to a user, in accordance with some embodiments of this disclosure. In various embodiments, the individual steps of process 1000 may be implemented by one or more components of the computing devices and systems of FIGS. 1-9 and may be performed in combination with any of the other processes and aspects described herein. Although the present disclosure may describe certain steps of process 1000 (and of other processes described herein) as being implemented by certain components of the computing devices and systems of FIGS. 1-9, this is for purposes of illustration only. It should be understood that other components of the computing devices and systems of FIGS. 1-9 may implement those steps instead.

At 1002, control circuitry (e.g., control circuitry 804 of FIG. 8 and/or control circuitry 911 of FIG. 9) may establish a virtual meeting over a network (e.g., network 909 of FIG. 9) between a first computing device of a first user (e.g., User K of FIG. 1 or User 6 at 701 of FIG. 7) and one or more second computing devices each corresponding to at least one second user. For example, the virtual meeting may correspond to the virtual meeting of FIG. 1 including devices of Users A-N or the virtual meeting of FIG. 2 including devices of Users 1-17. Such devices may be connected via the network to a server (e.g., server 904 of FIG. 9) which may provide the virtual meeting, e.g., host the virtual meeting and facilitate the exchange of image, video, audio, text or other data or any combination thereof as between virtual meeting participants, and begin to render content to the virtual meeting participants.

At 1004, the control circuitry may determine whether a break in presence (BIP) has occurred at a first computing device for the first user (e.g., a computing device of User K of FIG. 1 or a computing device of User 6 at 701 of FIG. 7). In some embodiments, the BIP event may be detected based on monitoring conditions of a network (e.g., a network connection of computing device 108 to a server facilitating or providing the virtual meeting). For example, the summary generator system may detect, based on communication network feedback, that device 108 of User K is experiencing a BIP event caused by network problems or errors. As another example, the summary generator system may detect the BIP for device 108 based on receiving an explicit input from a user (e.g., selection of an option to exit a virtual meeting or input indicating "I'll be right back,") or detecting that the, based on one or more sensors included in or associated with or external to computing device 108, that User K has exited the vicinity of computing device 108 for a threshold period of time.

In some embodiments, one or more users experiencing a BIP and an associated start time of the BIP event (e.g., a timestamp of the virtual meeting) may be determined by the control circuitry. In some embodiments, the BIP may be detected by a camera of the user's device or a camera external to and in the vicinity of the user's device using computer vision techniques, e.g., comparing consecutive frames captured by the camera to determine if there is a change with respect to the user's presence in the frame.

At 1006, the control circuitry may cause each of the one or more second computing devices to locally monitor reactions of the corresponding at least one second user to the virtual meeting during the BIP. Such reactions may be in the form of audio uttered by users, voice reactions of users, body posture of users, body language of users, facial expressions of users, behavior of users, gestures of users, text input by users, or actions of users, or any combination thereof, performed by each of the users that remain as participants in the virtual meeting. In some embodiments, one or more machine learning models (e.g., model 300 of FIG. 3, and/or the federated learning approach shown in FIG. 4) may be used to monitor and analyze user reactions.

In some embodiments the control circuitry (e.g., 911 of server 904) may transmit a request to all remaining participants' devices or a subset thereof to locally analyze the reactions of the corresponding user(s). This may be performed by using the local devices to analyze the records of the users at the user-side using a decentralized approach. 1006 may enable a determination to be made as to whether a particular portion of a virtual meeting during the BIP should be included in a summary of such portion, e.g., to decide the importance of portions of the video conference.

In the example of FIG. 2 one or more device(s) corresponding to Users 1, 5, 9, 12, 14 and 17 may locally monitor and determine (e.g., based on a captured images using a camera of the computing device) that each such users is facing forward during a particular portion (e.g., a particular time period) of the virtual meeting during the BIP. As another example, in response to detecting the BIP, one or more device(s) corresponding to Users 3, 7, 10, and 11 may locally monitor and determine that each of User 3, 7, 10, and 11 is taking notes during a particular portion of the virtual meeting during the BIP). As another example, in response to detecting the BIP, one or more device(s) corresponding to Users 4, 8, 13, 15 and 16 may locally monitor and determine that each of User 4, 8, 13, 15 and 16 is looking aside during a particular portion of the virtual meeting during the BIP. In some embodiments, determining a particular reaction may comprise determining that such posture or action or gesture is maintained or performed for a threshold period of time (e.g., 5 seconds or any other suitable time) consecutively or non-consecutively.

As shown in FIG. 2, to determine an importance of one or more portions of the virtual meeting during the BIP, a frame in which a user is determined to be looking forward may be assigned a weight of +1, a frame in which a user is determined to be taking notes may be assigned a weight of +2, and a frame in which a user is determined to be looking aside such as left or right may be assigned a weight of −1. A particular time's overall importance score of the virtual meeting may be a summation of the weights, which in the example of FIG. 2 may be 9 (e.g., adding together +1, +2, −1, +1, +2, −1, +1, +2, +2, +1, −1, +1, −1, −1, +1). In some embodiments, a particular time's overall importance score may be computed using any other suitable technique, e.g., mean, median, mode, on a per user basis, weighting certain users higher than others, or any other suitable technique, or any combination thereof. In some embodiments, the importance score may be compared to a threshold (e.g., 5 or any other suitable value), and may a time point of the virtual meeting during the BIP may be determined to be sufficiently important if the importance score exceeds the threshold.

At 1008, the control circuitry may receive, at the server (e.g., server 904), one or more parameters associated with each of the locally monitored reactions of the at least one second user from the corresponding one or more second computing devices, wherein each of the one or more parameters corresponds to a portion of the virtual meeting during the BIP. For example, the computing devices of the users may transmit as the parameters indications of a number of total reactions associated with a particular timepoint of the virtual meeting, a number of certain types of reactions to a certain timepoint of the virtual meeting, a frequency that certain words or phrases or terms are used during one or more portions of the virtual meeting during the BIP (e.g., as discussed in FIG. 6) and/or any other suitable metrics. In some embodiments, the parameters may further comprise locally determined weights or other parameters for machine learning models implemented at respective devices of users participating in the virtual meeting, to enable a global shared model (e.g., 420 of FIG. 4) to update its parameters accordingly.

At 1010, the control circuitry may determine that the BIP has ended. For example, the control circuitry may receive input from a user (e.g., User K of FIG. 1) that he or she has returned, or one or more sensors may determine that the user is again in the vicinity of the user's device participating in the virtual meeting, or the control circuitry may determine that the previous network errors that may have contributed to the BIP have been resolved.

At 1012, the control circuitry may determine whether a summary associated with a corresponding portion of the virtual meeting during the BIP should be generated. For example, the BIP may determine whether the importance score of one or more portions of the virtual meeting during the BIP exceed a threshold. In some embodiments, the importance score may more heavily weight certain detected reactions, e.g., relating to topics indicated as of interest to the BIP user and/or exhibited by users indicated as of interest to the BIP user or otherwise sharing common characteristics with the BIP user, such as location or interest or any other suitable characteristics. A negative determination at 1012 may result in processing proceeding to 1018, e.g., such as if the portion during the BIP is not deemed sufficiently important, and the BIP user (e.g., User K) having been rejoined to the virtual meeting may not be provided with a summary. On the other hand, a positive determination at 1012 may result in processing proceeding to 1014.

At 1014, the control circuitry may generate and renders the summary based on the parameters received by the server (e.g., server 904) of FIG. 9) at 1008. For example, in a virtual meeting comprising 10 participants, a user may experience a BIP at the 10th minute of the virtual meeting and return at the 20th minute of the virtual meeting. During the 10 minutes missed by the user due to the BIP, 3 of the remaining 9 users may react to the 11th minute of the virtual meeting and 5 of the remaining 9 users may react to the 15th minute of the virtual meeting. The central server may retrieve parameters associated with the timestamps, e.g., [11th minute, 3/9] and [$15^{th}$ minute, 5/9]. In some embodiments, such as in this example, the importance score may be based at least in part on a proportion of reactions of the remaining users in the virtual meeting. The control circuitry may generate the summary (e.g., summary 710) based on the importance scores associated with the time periods in which reactions took place, and render the summary to the one or more BIP users at 1016.

At 1016, the summary may be provided to the user (e.g., User K) having experienced the BIP during the virtual meeting during the ongoing virtual meeting or subsequent to the virtual meeting. In some embodiments, the summary may be provided immediately, either automatically or the user may be provided with an option to access the summary. In some embodiments, the summary may be provided at a time that is determined, based on reactions of the users, to be a less important time period of the virtual meeting. In some embodiments, it may be preferable to provide the summary earlier or later within the virtual meeting once the user returns. In some embodiments, the user may be provided with a notification, e.g., an email, a text message or another electronic message, indicating the availability of the summary, and the message may be selectable to launch the playing of the summary.

Figure 11:
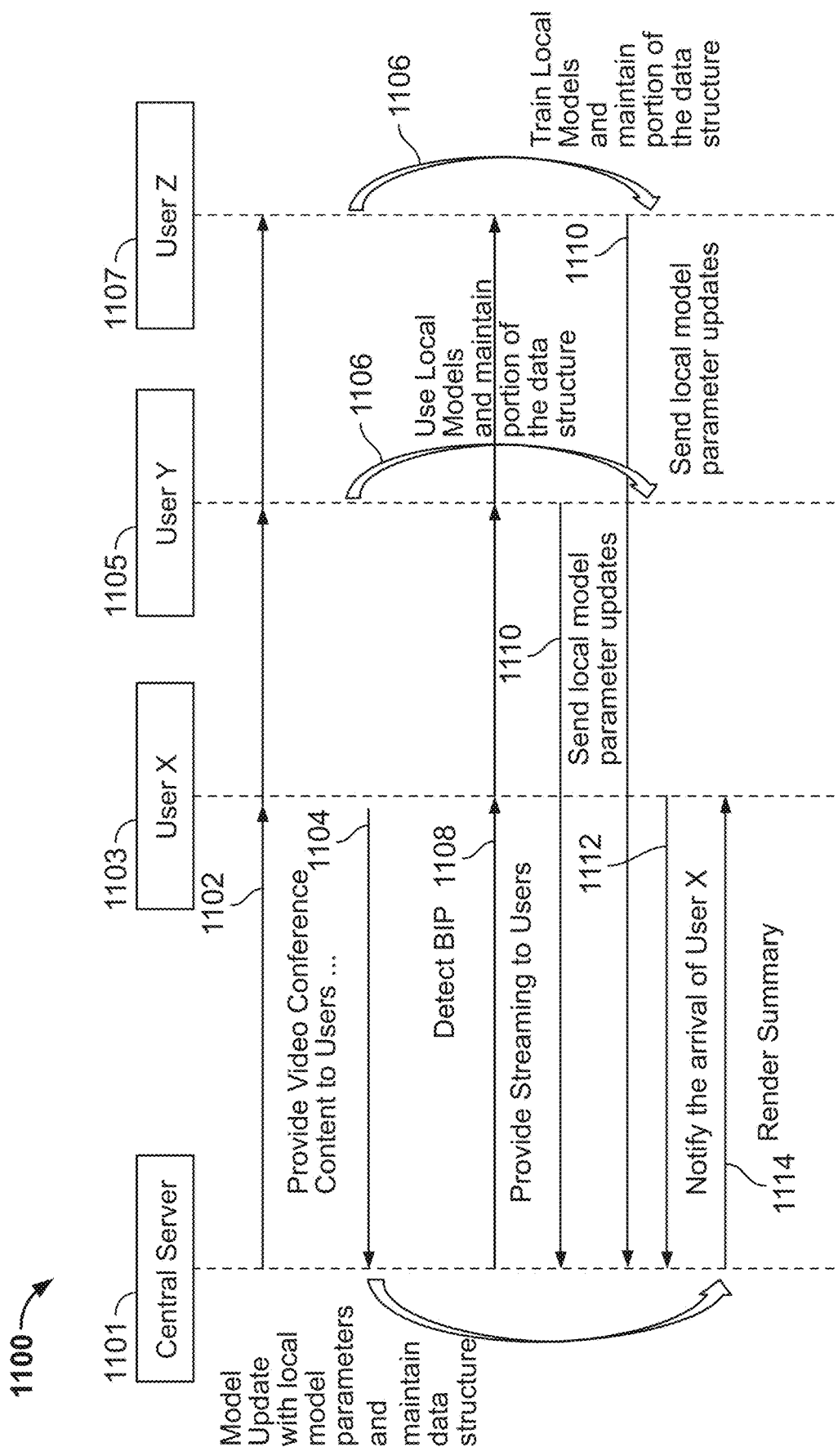
FIG. 11 is a flowchart of a detailed illustrative process for providing a summary of a portion of a virtual meeting to a user, in accordance with some embodiments of this disclosure.

FIG. 11 is a flowchart of a detailed illustrative process 1100 for providing a summary of a portion of a virtual meeting to a user, in accordance with some embodiments of this disclosure. In various embodiments, the individual steps of process 1100 may be implemented by one or more components of the computing devices and systems of FIGS. 1-9 and may be performed in combination with any of the other processes and aspects described herein. Although the present disclosure may describe certain steps of process 1000 (and of other processes described herein) as being implemented by certain components of the computing devices and systems of FIGS. 1-9, this is for purposes of illustration only. It should be understood that other components of the computing devices and systems of FIGS. 1-9 may implement those steps instead.

At 1102, central server 1101 (e.g., server 904 of FIG. 9) to provide virtual meeting content (e.g., video, images, audio and/or text) to one or more devices (e.g., associated with User X, User Y and User Z indicated at 1103, 1105 and 1107, respectively). At 1104, a computing device of User X may notify central server 1101 that User X is temporarily leaving the virtual meeting and will return shortly, e.g., based on determining a BIP for User X. Central server 1101 may request that devices of User Y and User Z monitor and analyze the corresponding users' verbal and/or visual and/or any other suitable reactions, and generate parameters based on such monitoring and analysis.

At 1106, devices of User Y and User Z may utilize locally trained machine learning models to analyze the behavior of User Y and User Z, respectively during the BIP associated with User X. Such devices may further update a word cloud or other data structure (e.g., data structure 600 of FIG. 6) to determine a topic of the virtual meeting and/or a frequency that certain words or terms or phrases are being used in the virtual meeting. At 1108, central server 1101 may continue to provide the virtual meeting to the computing devices of User Y and User Z. At 1110, the computing devices of User X and User Z may transmit local model parameter updates based on the analysis being performed of the user reactions using the local machine learning models. These parameters may provide the central server with the most significant moments in the virtual meeting during the BIP period and may also provide updated weights for the machine learning model to enable the central server to update a shared global model. In some embodiments, the parameters that provide the most significant moments for the purpose of summarization may include indications of a number or type of reactions of User Y and User Z at various time points during the BIP associated with User X.

In some embodiments, the locally learnt parameters may be shared with the central server each time a parameter is updated at the computing device, or, to decrease a number of communications with the central server, may be transmitted after a couple of iterations of local machine learning models. In some embodiments, a data size of the transmitted updates may be reduced by eliminating mostly correlated parameters, e.g., by one or more various dimensionality reduction techniques, such as, for example, principal component analysis (PCA). In some embodiments, the global model at central server 1101 may be re-adapted such that that it takes reduced features as input, integrates them, classifies one or more important instances, and transmits the integrated features back to clients. In such example, instead of model parameters, the embeddings may be transmitted to the central server and the aggregated embeddings may be transmitted by the server to the client devices.

At 1112, the computing device of User X may notify central server 1101 that the BIP event has concluded and/or that User X is again participating in the virtual meeting. At 1114, the central server 1101 may render the summary of the virtual meeting during the BIP to User X, based on the parameters received at 1110. In some embodiments, a starting time to render content summarization to the user can be determined based on an earliest available opportunity or based on a least important upcoming portion of the virtual meeting (which may be determined based on analyzing user's reactions or metadata associated with such portion or based on User X's interests, or any combination thereof.

In some embodiments, the proposed federated machine learning approach for the analysis of privacy-sensitive user data distributed across multiple computing devices without sharing the user audio/video/text data with the central server may be used in any suitable environment, e.g., collaborative XR applications enabling multiple XR users to work on the same task simultaneously, including collaborative surgeries, product designs, and education.

The processes discussed above are intended to be illustrative and not limiting. One skilled in the art would appreciate that the steps of the processes discussed herein may be omitted, modified, combined and/or rearranged, and any additional steps may be performed without departing from the scope of the invention. More generally, the above disclosure is meant to be illustrative and not limiting. Only the claims that follow are meant to set bounds as to what the present invention includes. Furthermore, it should be noted that the features described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A computer-implemented method comprising:
determining that a first computing device, a second computing device, and a third computing device are participating in a virtual meeting, wherein each of the first computing device, the second computing device, and the third computing device is connected via a network to a server providing the virtual meeting, and wherein the first computing device, the second computing device, and the third computing device respectively correspond to a first user, a second user, and a third user;
determining that the first computing device is experiencing a break in presence (BIP) in association with the virtual meeting, wherein the second computing device and the third computing device of the second user and the third user, respectively, remain in the virtual meeting, and are not experiencing a BIP, during the BIP being experienced at the first computing device of the first user;
based at least in part on determining the BIP is being experienced at the first computing device of the first user, causing the second computing device to locally analyze at least one of video data or audio data of the second user captured at the second device to locally determine one or more reactions of the second user during the BIP and causing the third computing device to locally analyze at least one of video data or audio data of the third user captured at the third device to locally determine one or more reactions of the third user during the BIP;
receiving, at the server, one or more parameters associated with the locally determined reactions of at least one of the second user or the third user, wherein each of the one or more parameters corresponds to a portion of the virtual meeting that occurred while the first computing device was experiencing the BIP, and wherein, to help preserve privacy of the second user and the third user, the server does not analyze the video data or the audio data of the second user captured at the second device or the video data or the audio data of the third user captured at the third device, and the one or more parameters received at the server comprise data of the determined reactions that is at least partially anonymized;
based at least in part on the received one or more parameters, generating a summary associated with the portion of the virtual meeting that occurred while the first computing device was experiencing the BIP; and
providing the summary to the first computing device of the first user.

2. The method of claim 1, wherein:
determining that the first computing device of the first user is experiencing the BIP is based at least in part on:
determining that user input received at the first computing device indicates that the first user is leaving the virtual meeting and that the user input indicates instructions to include in the summary a subsequent portion of the virtual meeting that corresponds to at least one of a particular subject or audio received from the second user or the third user; and
generating the summary comprises:
identifying the subsequent portion while the first computing device is experiencing the BIP; and
causing at least a portion of the summary to comprise the subsequent portion.

3. The method of claim 1, wherein determining the BIP is being experienced at the first computing device of the first user comprises at least one of detecting that the first user has exited a vicinity of the first computing device, detecting that a microphone of the first computing device has been muted, detecting that a camera of the first computing device has been disabled, detecting an error associated with a connection over the network between the first computing device and the server, or detecting an error associated with the first computing device.

4. The method of claim 1, wherein the virtual meeting is an extended reality (XR) session, a video communication session, an audio communication session, a chat communication session, or any combination thereof.

5. The method of claim 1, further comprising:
determining whether to include the one or more reactions of the second user or the third user in the summary based at least in part on whether consent has been received from the second user or the third user, respectively.

6. The method of claim 5, further comprising:
determining that the third user has not consented to having his or her one or more reactions included in the summary; and
based at least in part on determining that the third user has not consented to having his or her reaction included in the summary, refraining from including the one or more reactions of the third user in the summary, while determining whether to generate the summary based at least in part on the one or more reactions of the third user.

7. The method of claim 1, wherein causing the second computing device to locally monitor one or more reactions of the second user during the BIP and causing the third computing device to locally monitor one or more reactions of the third user during the BIP comprises:
causing the second computing devices to capture at least one of video data or audio data of the third user during the BIP at the first computing device of the first user; and
causing the third computing devices to capture at least one of video data or audio data of the third user during the BIP at the first computing device of the first user.

8. The method of claim 1, wherein the one or more parameters associated with the one or more reactions of the second user and the third user and transmitted to the server comprise at least one of:
an indication of a number of users that reacted to the portion of the of the virtual meeting during the BIP experienced at the first computing device of the first user; or
an indication of one or more types of the one or more reactions to the portion of the virtual meeting during the BIP at the first computing device of the first user.

9. The method of claim 1, further comprising:
based at least in part on determining that an association between the first user and the second user is stronger than an association between the first user and the third user, causing the summary to include more reactions of the second user to the portion of the virtual meeting during the BIP being experienced by the first computing device as compared to reactions of the third user to the portion of the virtual meeting during the BIP being experienced by the first computing device.

10. A system comprising:
a server; and
control circuitry configured to:
  determine that a first computing device, a second computing device, and a third computing device are participating in a virtual meeting, wherein each of the first computing device, the second computing device, and the third computing device is connected via a network to the server providing the virtual meeting, and wherein the first computing device, the second computing device, and the third computing device respectively correspond to a first user, a second user, and a third user;
  determine that the first computing device is experiencing a break in presence (BIP) in association with the virtual meeting, wherein the second computing device and the third computing device of the second user and the third user, respectively, remain in the virtual meeting, and are not experiencing a BIP, during the BIP being experienced at the first computing device of the first user;
  based at least in part on determining the BIP is being experienced at the first computing device of the first user, cause the second computing device to locally analyze at least one of video data or audio data of the second user captured at the second device to locally determine one or more reactions of the second user during the BIP and cause the third computing device to locally analyze at least one of video data or audio data of the third user captured at the third device to locally determine one or more reactions of the third user during the BIP;
  receive, at the server, one or more parameters associated with the locally determined reactions of at least one of the second user or the third user, wherein each of the one or more parameters corresponds to a portion of the virtual meeting that occurred while the first computing device was experiencing the BIP, and wherein, to help preserve privacy of the second user and the third user, the server does not analyze the video data or the audio data of the second user captured at the second device or the video data or the audio data of the third user captured at the third device, and the one or more parameters received at the server comprise data of the determined reactions that is at least partially anonymized;
  based at least in part on the received one or more parameters, generate a summary associated with the portion of the virtual meeting that occurred while the first computing device was experiencing the BIP; and
provide the summary to the first computing device of the first user.

11. The system of claim 10, wherein:
the control circuitry is further configured to determine that the first computing device of the first user is experiencing the BIP is based at least in part on:
  determining that user input received at the first computing device indicates that the first user is leaving the virtual meeting and that the user input indicates instructions to include in the summary a subsequent portion of the virtual meeting that corresponds to at least one of a particular subject or audio received from the second user or the third user; and the control circuitry is further configured to generate the summary by:
  identifying the subsequent portion while the first computing device is experiencing the BIP; and
  causing at least a portion of the summary to comprise the subsequent portion.

12. The system of claim 10, wherein the control circuitry is further configured to determine the BIP is being experienced at the first computing device of the first user comprises at least one of detecting that the first user has exited a vicinity of the first computing device, detecting that a microphone of the first computing device has been muted, detecting that a camera of the first computing device has been disabled, detecting an error associated with a connection over the network between the first computing device and the server, or detecting an error associated with the first computing device.

13. The system of claim 10, wherein the virtual meeting is an extended reality (XR) session, a video communication session, an audio communication session, a chat communication session, or any combination thereof.

14. The system of claim 10, wherein the control circuitry is further configured to:
  determine whether to include the one or more reactions of the second user or the third user in the summary based at least in part on whether consent has been received from the second user or the third user, respectively.

15. The system of claim 14, wherein the control circuitry is further configured to:
  determine that the third user has not consented to having his or her one or more reactions included in the summary; and
  based at least in part on determining that the third user has not consented to having his or her reaction included in the summary, refrain from including the one or more reactions of the third user in the summary, while determining whether to generate the summary based at least in part on the one or more reactions of the third user.

16. The system of claim 10, wherein the control circuitry is further configured to cause the second computing device to locally monitor one or more reactions of the second user during the BIP and causing the third computing device to locally monitor one or more reactions of the third user during the BIP by:
  causing the second computing devices to capture at least one of video data or audio data of the third user during the BIP at the first computing device of the first user; and
  causing the third computing devices to capture at least one of video data or audio data of the third user during the BIP at the first computing device of the first user.

17. The system of claim 10, wherein the one or more parameters associated with the one or more reactions of the second user and the third user and transmitted to the server comprise at least one of:
  an indication of a number of users that reacted to the portion of the of the virtual meeting during the BIP experienced at the first computing device of the first user; or
  an indication of one or more types of the one or more reactions to the portion of the virtual meeting during the BIP at the first computing device of the first user.

18. The system of claim 10, wherein the control circuitry is further configured to:
  based at least in part on determining that an association between the first user and the second user is stronger than an association between the first user and the third user, cause the summary to include more reactions of the second user to the portion of the virtual meeting during the BIP being experienced by the first computing device as compared to reactions of the third user to the portion of the virtual meeting during the BIP being experienced by the first computing device.

19. The method of claim 1, wherein the video data and the audio data of the second user captured at the second device is not transmitted to the server, and the video data and the audio data of the third user captured at the third device is not transmitted to the server.

20. The system of claim 10, wherein the video data and the audio data of the second user captured at the second device is not transmitted to the server, and the video data and the audio data of the third user captured at the third device is not transmitted to the server.

\* \* \* \* \*